(12) United States Patent
Gujar et al.

(10) Patent No.: US 11,777,793 B2
(45) Date of Patent: Oct. 3, 2023

(54) LOCATION CRITERIA FOR SECURITY GROUPS

(71) Applicant: VMware, Inc., Palo Alto, CA (US)

(72) Inventors: Bhagyashree Gujar, Pune (IN); Ujwala Kawalay, Pune (IN); Prayas Gaurav, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/322,318

(22) Filed: May 17, 2021

(65) Prior Publication Data
US 2021/0314219 A1 Oct. 7, 2021

Related U.S. Application Data

(63) Continuation-in-part of application No. 16/906,955, filed on Jun. 19, 2020.

(30) Foreign Application Priority Data

Apr. 6, 2020 (IN) .............................. 202041015134
Apr. 2, 2021 (IN) .............................. 202141015772

(51) Int. Cl.
*H04L 41/08* (2022.01)

(52) U.S. Cl.
CPC .................................. *H04L 41/08* (2013.01)

(58) Field of Classification Search
CPC ....................................................... H04L 41/08
USPC ........................................................ 709/223
See application file for complete search history.

(56) References Cited

U.S. PATENT DOCUMENTS

| 5,842,043 A | 11/1998 | Nishimura |
| 6,219,699 B1 | 4/2001 | McCloghrie et al. |
| 6,347,374 B1 | 2/2002 | Drake et al. |
| 6,615,230 B2 | 9/2003 | Nishimura |
| 7,502,884 B1 | 3/2009 | Shah et al. |
| 7,539,745 B1 | 5/2009 | Wang et al. |
| 7,802,000 B1 | 9/2010 | Huang et al. |

(Continued)

FOREIGN PATENT DOCUMENTS

| CN | 102124456 A | 7/2011 |
| CN | 102986172 A | 3/2013 |

(Continued)

OTHER PUBLICATIONS

Author Unknown, "Apache Cassandra™ 1.2 Documentation," Jan. 13, 2013, 201 pages, DataStax.

(Continued)

*Primary Examiner* — Kevin S Mai
(74) *Attorney, Agent, or Firm* — ADELI LLP

(57) ABSTRACT

Some embodiments provide a method for distributing a group definition for a group of machines. The method receives the group definition, which includes (i) a span of the group that specifies a set of sites at which the group is to be used and (ii) a set of criteria for machines to be included in the group. The set of criteria includes at least a location criteria specifying one or more sites. The method distributes the group definition to each site in the set of sites. At each site in the set of sites, a local network control system of the site determines a set of machines in the group based on the set of criteria. Only machines in the one or more sites specified by the location criteria are determined to be in the group.

21 Claims, 17 Drawing Sheets

(56) References Cited

U.S. PATENT DOCUMENTS

| | | |
|---|---|---|
| 7,965,699 B1 | 6/2011 | Accardi et al. |
| 8,443,363 B1 | 5/2013 | Brennan et al. |
| 8,479,275 B1 | 7/2013 | Naseh |
| 8,611,351 B2 | 12/2013 | Gooch et al. |
| 8,625,616 B2 | 1/2014 | Vobbilisetty et al. |
| 8,660,129 B1 | 2/2014 | Brendel et al. |
| 8,707,417 B1 | 4/2014 | Liang et al. |
| 9,069,599 B2 | 6/2015 | Martinez et al. |
| 9,215,213 B2 | 12/2015 | Bansal et al. |
| 9,294,270 B2 | 3/2016 | Wainner et al. |
| 9,311,122 B2 | 4/2016 | Guay et al. |
| 9,330,161 B2 | 5/2016 | D'Amato et al. |
| 9,432,215 B2 | 8/2016 | Stabile et al. |
| 9,602,312 B2 | 3/2017 | Koponen et al. |
| 9,672,054 B1 | 6/2017 | Gupta et al. |
| 9,672,060 B2 | 6/2017 | Behere et al. |
| 9,825,851 B2 | 11/2017 | Agarwal et al. |
| 9,847,938 B2 | 12/2017 | Chanda et al. |
| 9,876,711 B2 | 1/2018 | Chu et al. |
| 9,906,560 B2 | 2/2018 | Jain et al. |
| 9,912,616 B2 | 3/2018 | Shen et al. |
| 9,923,811 B2 | 3/2018 | Agarwal et al. |
| 9,977,688 B2 | 5/2018 | Nipane et al. |
| 10,091,028 B2 | 10/2018 | Koponen et al. |
| 10,110,417 B1 | 10/2018 | Hankins et al. |
| 10,120,668 B2 | 11/2018 | Palavalli et al. |
| 10,129,142 B2 | 11/2018 | Goliya et al. |
| 10,135,675 B2 | 11/2018 | Yu et al. |
| 10,142,127 B2 | 11/2018 | Cherian et al. |
| 10,162,656 B2 | 12/2018 | Palavalli et al. |
| 10,187,302 B2 | 1/2019 | Chu et al. |
| 10,205,771 B2 | 2/2019 | Palavalli et al. |
| 10,241,820 B2 | 3/2019 | Lambeth et al. |
| 10,243,797 B2 | 3/2019 | Lambeth et al. |
| 10,243,834 B1 | 3/2019 | Shekhar et al. |
| 10,243,846 B2 | 3/2019 | Jiang et al. |
| 10,243,848 B2 | 3/2019 | Agarwal et al. |
| 10,257,049 B2 | 4/2019 | Fried et al. |
| 10,298,489 B2 | 5/2019 | Williams et al. |
| 10,333,959 B2 | 6/2019 | Katrekar et al. |
| 10,339,123 B2 | 7/2019 | Venkatesh et al. |
| 10,412,018 B1 | 9/2019 | Feng et al. |
| 10,423,790 B2 | 9/2019 | Patil et al. |
| 10,560,343 B1 | 2/2020 | Cartsonis et al. |
| 10,579,945 B2 | 3/2020 | Gaurav et al. |
| 10,587,479 B2 | 3/2020 | Shakimov et al. |
| 10,601,705 B2 | 3/2020 | Hira et al. |
| 10,616,279 B2 | 4/2020 | Nimmagadda et al. |
| 10,637,800 B2 | 4/2020 | Wang et al. |
| 10,673,752 B2 | 6/2020 | Agarwal et al. |
| 10,693,833 B2 | 6/2020 | Mathew et al. |
| 10,832,224 B2 | 11/2020 | Palavalli et al. |
| 10,862,753 B2 | 12/2020 | Hira et al. |
| 10,880,158 B2 | 12/2020 | Lambeth et al. |
| 10,880,170 B2 | 12/2020 | Wang et al. |
| 10,897,420 B1 | 1/2021 | Pianigiani et al. |
| 10,908,938 B2 | 2/2021 | Palavalli et al. |
| 10,942,788 B2 | 3/2021 | Palavalli et al. |
| 10,999,154 B1 | 5/2021 | Ahrenholz et al. |
| 11,057,275 B1 | 7/2021 | Arunachalam et al. |
| 11,088,902 B1 | 8/2021 | Palavalli et al. |
| 11,088,916 B1 | 8/2021 | Chandrashekhar et al. |
| 11,088,919 B1 | 8/2021 | Chandrashekhar et al. |
| 11,115,301 B1 | 9/2021 | Margarian et al. |
| 11,133,958 B2 | 9/2021 | Torvi et al. |
| 11,153,170 B1 | 10/2021 | Chandrashekhar et al. |
| 11,182,163 B1 | 11/2021 | Beals et al. |
| 11,258,668 B2 | 2/2022 | Chandrashekhar et al. |
| 11,303,557 B2 | 4/2022 | Chandrashekhar et al. |
| 11,316,773 B2 | 4/2022 | Dubey et al. |
| 11,336,486 B2 | 5/2022 | Sharma et al. |
| 11,336,556 B2 | 5/2022 | Chandrashekhar et al. |
| 11,343,227 B2 | 5/2022 | Vaidya et al. |
| 11,343,283 B2 | 5/2022 | Vaidya et al. |
| 11,374,817 B2 | 6/2022 | Chandrashekhar et al. |
| 11,374,850 B2 | 6/2022 | Chandrashekhar et al. |
| 11,381,456 B2 | 7/2022 | Manzanilla et al. |
| 11,394,634 B2 | 7/2022 | Chandrashekhar et al. |
| 2002/0029270 A1 | 3/2002 | Szczepanek |
| 2002/0093952 A1 | 7/2002 | Gonda |
| 2002/0131414 A1 | 9/2002 | Hadzic |
| 2003/0046347 A1 | 3/2003 | Nishimura |
| 2003/0167333 A1 | 9/2003 | Kumar et al. |
| 2003/0185151 A1 | 10/2003 | Kurosawa et al. |
| 2003/0185152 A1 | 10/2003 | Nederveen et al. |
| 2003/0188114 A1 | 10/2003 | Lubbers et al. |
| 2003/0188218 A1 | 10/2003 | Lubbers et al. |
| 2004/0052257 A1 | 3/2004 | Abdo et al. |
| 2005/0190757 A1 | 9/2005 | Sajassi |
| 2005/0235352 A1 | 10/2005 | Staats et al. |
| 2005/0288040 A1 | 12/2005 | Charpentier et al. |
| 2006/0092976 A1 | 5/2006 | Lakshman et al. |
| 2006/0179243 A1 | 8/2006 | Fields et al. |
| 2006/0179245 A1 | 8/2006 | Fields et al. |
| 2006/0193252 A1 | 8/2006 | Naseh et al. |
| 2006/0195896 A1 | 8/2006 | Fulp et al. |
| 2006/0221720 A1 | 10/2006 | Reuter |
| 2006/0250249 A1 | 11/2006 | Cheng |
| 2006/0251120 A1 | 11/2006 | Arimilli et al. |
| 2007/0058631 A1 | 3/2007 | Mortier et al. |
| 2007/0130295 A1 | 6/2007 | Rastogi et al. |
| 2007/0217419 A1 | 9/2007 | Vasseur |
| 2007/0219653 A1 | 9/2007 | Martin |
| 2007/0239987 A1 | 10/2007 | Hoole et al. |
| 2008/0013474 A1 | 1/2008 | Nagarajan et al. |
| 2008/0049646 A1 | 2/2008 | Lu |
| 2008/0104302 A1 | 5/2008 | Carpio |
| 2008/0133729 A1 | 6/2008 | Fridman et al. |
| 2008/0268847 A1 | 10/2008 | Mukherjee et al. |
| 2008/0301379 A1 | 12/2008 | Pong |
| 2009/0037367 A1 | 2/2009 | Wein |
| 2009/0070337 A1 | 3/2009 | Romem et al. |
| 2009/0193297 A1 | 7/2009 | Williams et al. |
| 2009/0241192 A1 | 9/2009 | Thomas |
| 2009/0279536 A1 | 11/2009 | Unbehagen et al. |
| 2009/0279545 A1 | 11/2009 | Moonen |
| 2009/0292858 A1 | 11/2009 | Lambeth et al. |
| 2009/0296726 A1 | 12/2009 | Snively et al. |
| 2010/0250784 A1 | 9/2010 | Henry et al. |
| 2010/0257263 A1 | 10/2010 | Casado et al. |
| 2010/0275199 A1 | 10/2010 | Smith et al. |
| 2010/0322255 A1 | 12/2010 | Hao et al. |
| 2011/0032898 A1 | 2/2011 | Kazmi et al. |
| 2011/0047218 A1 | 2/2011 | Nojima et al. |
| 2011/0051714 A1 | 3/2011 | Somes |
| 2011/0085569 A1 | 4/2011 | Gnanasekaran et al. |
| 2011/0164752 A1 | 7/2011 | Wainner et al. |
| 2011/0188509 A1 | 8/2011 | Kem et al. |
| 2011/0231602 A1 | 9/2011 | Woods et al. |
| 2011/0299413 A1 | 12/2011 | Chatwani et al. |
| 2012/0084406 A1 | 4/2012 | Kumbalimutt |
| 2012/0120964 A1 | 5/2012 | Koponen et al. |
| 2012/0147898 A1 | 6/2012 | Koponen et al. |
| 2012/0275328 A1 | 11/2012 | Iwata et al. |
| 2013/0018947 A1 | 1/2013 | Archer et al. |
| 2013/0024579 A1 | 1/2013 | Zhang et al. |
| 2013/0042242 A1 | 2/2013 | Kagan |
| 2013/0044636 A1 | 2/2013 | Koponen et al. |
| 2013/0044641 A1 | 2/2013 | Koponen et al. |
| 2013/0044761 A1 | 2/2013 | Koponen et al. |
| 2013/0058250 A1 | 3/2013 | Casado et al. |
| 2013/0058335 A1 | 3/2013 | Koponen et al. |
| 2013/0058350 A1 | 3/2013 | Fulton |
| 2013/0058354 A1 | 3/2013 | Casado et al. |
| 2013/0058358 A1 | 3/2013 | Fulton et al. |
| 2013/0060819 A1 | 3/2013 | Lambeth et al. |
| 2013/0060940 A1 | 3/2013 | Koponen et al. |
| 2013/0074065 A1 | 3/2013 | McNeeney et al. |
| 2013/0103817 A1 | 4/2013 | Koponen et al. |
| 2013/0125120 A1 | 5/2013 | Zhang et al. |
| 2013/0132533 A1 | 5/2013 | Padmanabhan et al. |
| 2013/0144992 A1 | 6/2013 | Barabash et al. |
| 2013/0159637 A1 | 6/2013 | Forgette et al. |
| 2013/0212212 A1 | 8/2013 | Addepalli et al. |

(56) References Cited

U.S. PATENT DOCUMENTS

| | | |
|---|---|---|
| 2013/0215769 A1 | 8/2013 | Beheshti-Zavareh et al. |
| 2013/0254328 A1 | 9/2013 | Inoue et al. |
| 2013/0286833 A1 | 10/2013 | Torres et al. |
| 2013/0287026 A1 | 10/2013 | Davie |
| 2013/0301425 A1 | 11/2013 | Udutha et al. |
| 2013/0301501 A1 | 11/2013 | Olvera-Hernandez et al. |
| 2013/0301646 A1 | 11/2013 | Bogdanski et al. |
| 2013/0308641 A1 | 11/2013 | Ackley |
| 2014/0006354 A1 | 1/2014 | Parkison et al. |
| 2014/0006357 A1 | 1/2014 | Davis et al. |
| 2014/0006465 A1 | 1/2014 | Davis et al. |
| 2014/0007239 A1 | 1/2014 | Sharpe et al. |
| 2014/0064104 A1 | 3/2014 | Nataraja et al. |
| 2014/0136908 A1 | 5/2014 | Maggiari et al. |
| 2014/0146817 A1 | 5/2014 | Zhang |
| 2014/0169365 A1 | 6/2014 | Sundaram et al. |
| 2014/0172740 A1 | 6/2014 | McCormick et al. |
| 2014/0201218 A1 | 7/2014 | Catalano et al. |
| 2014/0208150 A1 | 7/2014 | Abuelsaad et al. |
| 2014/0211661 A1 | 7/2014 | Gorkemli et al. |
| 2014/0241356 A1 | 8/2014 | Zhang et al. |
| 2014/0250220 A1 | 9/2014 | Kapadia et al. |
| 2014/0269435 A1 | 9/2014 | McConnell et al. |
| 2014/0301391 A1 | 10/2014 | Krishnan et al. |
| 2014/0304355 A1 | 10/2014 | Kamath et al. |
| 2014/0307744 A1 | 10/2014 | Dunbar et al. |
| 2014/0337500 A1 | 11/2014 | Lee |
| 2014/0351396 A1 | 11/2014 | Stabile et al. |
| 2015/0009797 A1 | 1/2015 | Koponen et al. |
| 2015/0010012 A1 | 1/2015 | Koponen et al. |
| 2015/0016276 A1 | 1/2015 | Decusatis et al. |
| 2015/0019444 A1 | 1/2015 | Purves |
| 2015/0063364 A1 | 3/2015 | Thakkar et al. |
| 2015/0067688 A1 | 3/2015 | Nagasawa et al. |
| 2015/0085862 A1 | 3/2015 | Song |
| 2015/0089034 A1 | 3/2015 | Stickle et al. |
| 2015/0100704 A1 | 4/2015 | Davie et al. |
| 2015/0103842 A1 | 4/2015 | Chandrashekhar et al. |
| 2015/0103843 A1 | 4/2015 | Chandrashekhar et al. |
| 2015/0106804 A1 | 4/2015 | Chandrashekhar et al. |
| 2015/0117256 A1 | 4/2015 | Sabaa et al. |
| 2015/0121483 A1 | 4/2015 | Perez et al. |
| 2015/0180909 A1 | 6/2015 | Nakamatsu et al. |
| 2015/0229641 A1 | 8/2015 | Sun et al. |
| 2015/0234668 A1 | 8/2015 | Ravinoothala et al. |
| 2015/0237014 A1 | 8/2015 | Bansal et al. |
| 2015/0263946 A1 | 9/2015 | Tubaltsev et al. |
| 2015/0264135 A1 | 9/2015 | Kandula et al. |
| 2015/0312274 A1 | 10/2015 | Bishop et al. |
| 2015/0312326 A1 | 10/2015 | Archer et al. |
| 2015/0324220 A1 | 11/2015 | Bugenhagen |
| 2015/0326467 A1 | 11/2015 | Fullbright et al. |
| 2015/0381494 A1 | 12/2015 | Cherian et al. |
| 2016/0057014 A1 | 2/2016 | Thakkar et al. |
| 2016/0094396 A1 | 3/2016 | Chandrashekhar et al. |
| 2016/0094661 A1 | 3/2016 | Jain et al. |
| 2016/0134528 A1 | 5/2016 | Lin et al. |
| 2016/0210209 A1 | 7/2016 | Verkaik et al. |
| 2016/0226700 A1 | 8/2016 | Zhang et al. |
| 2016/0226762 A1 | 8/2016 | Zhang et al. |
| 2016/0226822 A1 | 8/2016 | Zhang et al. |
| 2016/0226959 A1 | 8/2016 | Zhang et al. |
| 2016/0226967 A1 | 8/2016 | Zhang et al. |
| 2016/0277289 A1 | 9/2016 | Madabushi et al. |
| 2016/0352588 A1 | 12/2016 | Subbarayan et al. |
| 2016/0373530 A1 | 12/2016 | Duda |
| 2016/0380815 A1 | 12/2016 | Agarwal et al. |
| 2016/0380891 A1 | 12/2016 | Agarwal et al. |
| 2016/0380925 A1 | 12/2016 | Agarwal et al. |
| 2016/0380973 A1 | 12/2016 | Sullenberger et al. |
| 2017/0005988 A1* | 1/2017 | Bansal ................ H04L 41/0846 |
| 2017/0034052 A1 | 2/2017 | Chanda et al. |
| 2017/0034129 A1 | 2/2017 | Sawant et al. |
| 2017/0041347 A1 | 2/2017 | Nagaratnam et al. |
| 2017/0048110 A1 | 2/2017 | Wu et al. |
| 2017/0048130 A1 | 2/2017 | Goliya et al. |
| 2017/0063633 A1 | 3/2017 | Goliya et al. |
| 2017/0063794 A1 | 3/2017 | Jain et al. |
| 2017/0063822 A1 | 3/2017 | Jain et al. |
| 2017/0093617 A1 | 3/2017 | Chanda et al. |
| 2017/0093636 A1 | 3/2017 | Chanda et al. |
| 2017/0104720 A1 | 4/2017 | Bansal et al. |
| 2017/0126431 A1 | 5/2017 | Han et al. |
| 2017/0126551 A1 | 5/2017 | Pfaff et al. |
| 2017/0163442 A1 | 6/2017 | Shen et al. |
| 2017/0163532 A1 | 6/2017 | Tubaltsev et al. |
| 2017/0163598 A1 | 6/2017 | Shen et al. |
| 2017/0163599 A1 | 6/2017 | Shen et al. |
| 2017/0171055 A1 | 6/2017 | Wang et al. |
| 2017/0249195 A1 | 8/2017 | Sadana et al. |
| 2017/0250912 A1 | 8/2017 | Chu et al. |
| 2017/0264483 A1 | 9/2017 | Lambeth et al. |
| 2017/0288981 A1 | 10/2017 | Hong et al. |
| 2017/0289033 A1 | 10/2017 | Singh et al. |
| 2017/0302531 A1 | 10/2017 | Maes |
| 2017/0310641 A1 | 10/2017 | Jiang et al. |
| 2017/0317954 A1 | 11/2017 | Masurekar et al. |
| 2017/0317969 A1 | 11/2017 | Masurekar et al. |
| 2017/0317971 A1 | 11/2017 | Dubey et al. |
| 2017/0318113 A1 | 11/2017 | Ganichev et al. |
| 2017/0324645 A1 | 11/2017 | Johnsen et al. |
| 2017/0331711 A1 | 11/2017 | Duda |
| 2017/0344444 A1 | 11/2017 | Costa-Roberts et al. |
| 2018/0062880 A1 | 3/2018 | Yu et al. |
| 2018/0062881 A1 | 3/2018 | Chandrashekhar et al. |
| 2018/0062923 A1 | 3/2018 | Katrekar et al. |
| 2018/0062944 A1 | 3/2018 | Altman et al. |
| 2018/0063036 A1 | 3/2018 | Chandrashekhar et al. |
| 2018/0063195 A1* | 3/2018 | Nimmagadda ..... H04L 63/0263 |
| 2018/0083835 A1 | 3/2018 | Cole et al. |
| 2018/0123877 A1 | 5/2018 | Saxena et al. |
| 2018/0123903 A1 | 5/2018 | Holla et al. |
| 2018/0157537 A1 | 6/2018 | Chen et al. |
| 2018/0191682 A1 | 7/2018 | Liu et al. |
| 2018/0234337 A1 | 8/2018 | Goliya et al. |
| 2018/0234459 A1 | 8/2018 | Kung et al. |
| 2018/0309718 A1 | 10/2018 | Zuo |
| 2018/0373961 A1 | 12/2018 | Wang et al. |
| 2019/0014040 A1 | 1/2019 | Yerrapureddy et al. |
| 2019/0069335 A1 | 2/2019 | Wu |
| 2019/0109669 A1 | 4/2019 | Zachman et al. |
| 2019/0158537 A1 | 5/2019 | Miriyala |
| 2019/0190780 A1 | 6/2019 | Wang et al. |
| 2019/0207847 A1 | 7/2019 | Agarwal et al. |
| 2019/0245888 A1 | 8/2019 | Martinez et al. |
| 2019/0260610 A1 | 8/2019 | Dubey et al. |
| 2019/0260630 A1 | 8/2019 | Stabile et al. |
| 2019/0297114 A1 | 9/2019 | Panchalingam et al. |
| 2019/0303326 A1 | 10/2019 | Desai et al. |
| 2019/0334765 A1 | 10/2019 | Jain et al. |
| 2019/0342175 A1 | 11/2019 | Wan et al. |
| 2019/0363975 A1 | 11/2019 | Djernaes |
| 2019/0379731 A1 | 12/2019 | Johnsen et al. |
| 2020/0007392 A1 | 1/2020 | Goyal |
| 2020/0007582 A1* | 1/2020 | Dixit .................. H04L 41/0893 |
| 2020/0007584 A1 | 1/2020 | Dixit et al. |
| 2020/0014662 A1 | 1/2020 | Chanda et al. |
| 2020/0021541 A1 | 1/2020 | Chanda |
| 2020/0057669 A1 | 2/2020 | Hutcheson et al. |
| 2020/0076684 A1 | 3/2020 | Naveen et al. |
| 2020/0106744 A1 | 4/2020 | Miriyala et al. |
| 2020/0162325 A1 | 5/2020 | Desai et al. |
| 2020/0162337 A1 | 5/2020 | Jain et al. |
| 2020/0169496 A1 | 5/2020 | Goliya et al. |
| 2020/0195607 A1 | 6/2020 | Wang et al. |
| 2020/0257549 A1 | 8/2020 | Maznev et al. |
| 2020/0296035 A1 | 9/2020 | Agarwal et al. |
| 2020/0304427 A1 | 9/2020 | Sandler et al. |
| 2020/0358693 A1 | 11/2020 | Rawlins |
| 2020/0366741 A1 | 11/2020 | Kancherla et al. |
| 2020/0409563 A1 | 12/2020 | Parasnis et al. |
| 2021/0036889 A1 | 2/2021 | Jain et al. |
| 2021/0067556 A1 | 3/2021 | Tahan |
| 2021/0117908 A1 | 4/2021 | Coles et al. |

(56) References Cited

U.S. PATENT DOCUMENTS

| | | | |
|---|---|---|---|
| 2021/0126641 | A1 | 4/2021 | Yan et al. |
| 2021/0168197 | A1 | 6/2021 | Jones et al. |
| 2021/0194729 | A1 | 6/2021 | Semwal et al. |
| 2021/0311960 | A1 | 10/2021 | Rogozinsky et al. |
| 2021/0314192 | A1 | 10/2021 | Chandrashekhar et al. |
| 2021/0314193 | A1 | 10/2021 | Chandrashekhar et al. |
| 2021/0314212 | A1 | 10/2021 | Chandrashekhar et al. |
| 2021/0314215 | A1 | 10/2021 | Manzanilla et al. |
| 2021/0314225 | A1 | 10/2021 | Chandrashekhar et al. |
| 2021/0314226 | A1 | 10/2021 | Chandrashekhar et al. |
| 2021/0314227 | A1 | 10/2021 | Chandrashekhar et al. |
| 2021/0314228 | A1 | 10/2021 | Chandrashekhar et al. |
| 2021/0314235 | A1 | 10/2021 | Chandrashekhar et al. |
| 2021/0314251 | A1 | 10/2021 | Dubey et al. |
| 2021/0314256 | A1 | 10/2021 | Chandrashekhar et al. |
| 2021/0314257 | A1 | 10/2021 | Chandrashekhar et al. |
| 2021/0314258 | A1 | 10/2021 | Chandrashekhar et al. |
| 2021/0314289 | A1 | 10/2021 | Chandrashekhar et al. |
| 2021/0314291 | A1 | 10/2021 | Chandrashekhar et al. |
| 2021/0367834 | A1 | 11/2021 | Palavalli et al. |
| 2022/0103429 | A1 | 3/2022 | Vaidya et al. |
| 2022/0103430 | A1 | 3/2022 | Vaidya et al. |
| 2022/0103514 | A1 | 3/2022 | Vaidya et al. |
| 2022/0103521 | A1 | 3/2022 | Vaidya et al. |
| 2022/0103598 | A1 | 3/2022 | Vaidya et al. |
| 2022/0191126 | A1 | 6/2022 | Dubey et al. |
| 2022/0255896 | A1 | 8/2022 | Jain et al. |

FOREIGN PATENT DOCUMENTS

| | | | |
|---|---|---|---|
| CN | 103650433 A | | 3/2014 |
| CN | 103890751 A | | 6/2014 |
| CN | 110061899 A | | 7/2019 |
| EP | 1154601 A1 | | 11/2001 |
| EP | 1290856 A2 | | 3/2003 |
| EP | 1635506 A1 | | 3/2006 |
| EP | 1868318 A1 | | 12/2007 |
| EP | 3016331 A1 | | 5/2016 |
| EP | 3314831 A1 | | 5/2018 |
| EP | 3485610 A1 | | 5/2019 |
| WO | 2010028364 A1 | | 3/2010 |
| WO | 2011140028 A1 | | 11/2011 |
| WO | 2012113444 A1 | | 8/2012 |
| WO | 2013026049 A1 | | 2/2013 |
| WO | 2013152716 A1 | | 10/2013 |
| WO | 2015054671 A2 | | 4/2015 |
| WO | 2017003881 A1 | | 1/2017 |
| WO | 2018044341 A1 | | 3/2018 |
| WO | 2021206785 A1 | | 10/2021 |
| WO | 2021206786 A1 | | 10/2021 |
| WO | 2021206790 A1 | | 10/2021 |
| WO | 2022066269 A1 | | 3/2022 |

OTHER PUBLICATIONS

Author Unknown, "OpenFlow Switch Specification, Version 1.1.0 Implemented (Wire Protocol 0x02)," Feb. 28, 2011, 56 pages, Open Networking Foundation.
Berde, Pankaj, et al., "ONOS Open Network Operating System An Open-Source Distributed SDN OS," Dec. 19, 2013, 34 pages.
Hanna, Jeremy, "How ZooKeeper Handles Failure Scenarios," http://.apache.org/hadoop/Zookeeper/Failurescenarios. Dec. 9, 2010, 1 page.
Heller, Brandon, et al., "The Controller Placement Problem," Hot Topics in Software Defined Networks, Aug. 13, 2012, 6 pages, Helsinki, Finland.
Krishnaswamy, Umesh, et al., "ONOS Open Network Operating System—An Experimental Open-Source Distributed SDN OS," Apr. 16, 2013, 24 pages.
Lebresne, Sylvain, "[Release] Apache Cassandra 1.2 released," Jan. 2, 2013, 1 page.
Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.
Mahalingham, Mallik, et al., "VXLAN: A Framework for Overlaying Virtualized Layer 2 Networks over Layer 3 Networks," draft-mahalingham-dutt-dcops-vxlan-02.txt Internet Draft, Aug. 22, 2012, 20 pages, Internet Engineering Task Force.
Non-Published Commonly Owned Related International Patent Application PCT/US2021/015968 with similar specification, filed Jan. 31, 2021, 128 pages, VMware, Inc.
Non-Published Commonly Owned U.S. Appl. No. 16/906,889, filed Jun. 19, 2020, 125 pages, VMware, Inc.
Non-Published Commonly Owned U.S. Appl. No. 16/906,891, filed Jun. 19, 2020, 125 pages, VMware, Inc.
Non-Published Commonly Owned U.S. Appl. No. 16/906,893, filed Jun. 19, 2020, 126 pages, VMware, Inc.
Non-Published Commonly Owned U.S. Appl. No. 16/906,901, filed Jun. 19, 2020, 125 pages, VMware, Inc.
Non-Published Commonly Owned U.S. Appl. No. 16/906,902, filed Jun. 19, 2020, 126 pages, VMware, Inc.
Non-Published Commonly Owned U.S. Appl. No. 16/906,905, filed Jun. 19, 2020, 126 pages, VMware, Inc.
Non-Published Commonly Owned U.S. Appl. No. 16/906,908, filed Jun. 19, 2020, 125 pages, VMware, Inc.
Non-Published Commonly Owned U.S. Appl. No. 16/906,913, filed Jun. 19, 2020, 124 pages, VMware, Inc.
Non-Published Commonly Owned U.S. Appl. No. 16/906,925, filed Jun. 19, 2020, 111 pages, VMware, Inc.
Non-Published Commonly Owned U.S. Appl. No. 16/906,934, filed Jun. 19, 2020, 112 pages, VMware, Inc.
Non-Published Commonly Owned U.S. Appl. No. 16/906,935, filed Jun. 19, 2020, 114 pages, VMware, Inc.
Non-Published Commonly Owned U.S. Appl. No. 16/906,942, filed Jun. 19, 2020, 127 pages, VMware, Inc.
Non-Published Commonly Owned U.S. Appl. No. 16/906,950, filed Jun. 19, 2020, 128 pages, VMware, Inc.
Published Commonly Owned Related U.S. Appl. No. 16/906,955, with similar specification, filed Jun. 19, 2020, 127 pages, VMware, Inc.
Non-Published Commonly Owned U.S. Appl. No. 16/906,960, filed Jun. 19, 2020, 128 pages, VMware, Inc.
Non-Published Commonly Owned U.S. Appl. No. 16/906,964, filed Jun. 19, 2020, 126 pages, VMware, Inc.
Non-Published Commonly Owned U.S. Appl. No. 16/906,966, filed Jun. 19, 2020, 128 pages, VMware, Inc.
PCT International Search Report and Written Opinion of Commonly Owned International Patent Application PCT/US2021/015967, dated May 18, 2021, 13 pages, International Searching Authority (EP).
PCT International Search Report and Written Opinion of commonly owned International Patent Application PCT/US2021/015968, dated Apr. 23, 2021, 14 pages, International Searching Authority (EP).
PCT International Search Report and Written Opinion of Commonly Owned International Patent Application PCT/JS2021/016118, dated Apr. 15, 2021, 11 pages, International Searching Authority (EP).
Non-Published Commonly Owned U.S. Appl. No. 17/391,917, filed Aug. 2, 2021, 51 pages, VMware, Inc.
Author Unknown, "What is a Data Center?," Cyberpedia, Month Unknown 2022, 5 pages, Palo Alto Networks, retrieved from https://www.paloaltonetworks.com/cyberpedia/what-is-a-data-center.
Loshin, Peter, et al., "What is a data center?," Special Report: Everything You Need to Know About the Log4j Vulnerability, Oct. 2021, 13 pages, retrieved from https://searchdatacenter.techtarget.com/definition/data-center.
Non-Published Commonly Owned U.S. Appl. No. 17/685,948, filed Mar. 3, 2022, 132 pages, VMware, Inc.
Giannakou, Anna, et al., "AL-SAFE: A Secure Self-Adaptable Application-Level Firewall for IaaS Clouds," 2016 EEE 8th International Conference on Cloud Computing Technology and Science, Dec. 12-15, 2016, 8 pages, EEE, Luxembourg City, LU.
Kohila, N., et al., "Data Security in Local Network Using Distributed Firewall," International Journal of Scientific Research in

(56) References Cited

OTHER PUBLICATIONS

Computer Science Applications and Management Studies, Nov. 2014, 8 pages, vol. 3, Issue 6, jsrcams.com.

Schuba, Christoph, et al., "Integrated Network Service Processing Using Programmable Network Devices," SMLI TR-2005-138, May 2005, 30 pages, Sun Microsystems, Inc.

Surantha, Nico, et al., "Secure Kubernetes Networking Design Based on Zero Trust Model: A Case Study of Financial Service Enterprise in Indonesia," Innovative Mobile and Internet Services in Ubiquitous Computing, Jan. 2020, 14 pages, Springer Nature, Switzerland.

Wack, John, et al., "Guidelines on Firewalls and Firewall Policy," Recommendations of the National Institute of Standards and Technology, Special Publication 800-41, Jan. 2002, 75 pages, NIST, Gaithersburg, MD, USA.

\* cited by examiner

| Domain 1 Rule Set Definition | | | 1200 |
|---|---|---|---|
| Source | Destination | Action | |
| Group 1 | Group 3 | Drop | |
| External | Group 2 | Allow | |

*Figure 12*

LOCATION CRITERIA FOR SECURITY GROUPS

BACKGROUND

As more networks move to the cloud, it is more common for one corporation or other entity to have networks spanning multiple sites. While logical networks that operate within a single site are well established, there are various challenges in having logical networks span multiple physical sites (e.g., datacenters). The sites should be self-contained, while also allowing for data to be sent from one site to another easily. Various solutions are required to solve these issues.

BRIEF SUMMARY

For a logical network spanning multiple federated sites (e.g., multiple datacenters), some embodiments of the invention provide a method for defining a group of machines and distributing the group definition (e.g., for a security group) to at least a subset of the sites. In some embodiments, the group definition includes both (i) a span of the group that specifies a set of the sites at which the group is to be used and (ii) a set of criteria for machines to be included in the group. This set of criteria, in some embodiments, includes location criteria specifying one or more sites at which machines must be located in order to be members of the group. Other criteria can include machine characteristics (e.g., a specific type of operating system running on the machine, applications executing on the machine, machines running on a specific type of hypervisor, etc.), machine names in the management system, machine metadata in the management system, etc. The group definition is distributed to each site in the set of sites, and local network control systems at each of these sites determine the set of machines in the group based on the specified set of criteria (i.e., by identifying machines that match the set of criteria defined for the group).

In some embodiments, the group definition is received by a global manager that manages the entire logical network across the multiple sites. This global manager is part of a network management and control system along with the local network control systems at each of the individual sites, and distributes the group definition to local network managers at each site in the set of sites. These local network managers directly manage the logical network at their respective sites. In some embodiments, the global manager receives a global desired configuration for the logical network (e.g., from an administrator of the network), identifies a relevant portion of the global desired configuration for each site in the federation, and provides the identified portion to the site's corresponding local manager. This global desired configuration includes the group definition, which is included in the relevant portion for each site in the set of sites.

In some embodiments, the local network manager at each site in the set of sites spanned by the group distributes the group definition to a set of network controllers at the site (e.g., a single controller machine, a cluster of controllers, etc.). The network controllers at each site resolve the group definition into a set of machine identifiers (e.g., a set of network addresses, UUIDs, etc.) by determining the machines that are located at their site and that meet the specified criteria for the group. In the case of a group with location criteria, the controllers at sites that are spanned by the group but not specified in the location criteria will not identify any machines at their site that meet the criteria. Each set of network controllers at a site spanned by the group provides their set of machine identifiers to the network controllers at each of the other sites spanned by the group (these connections can be arranged as a full mesh, a hub-and-spoke, etc.), such that each site spanned by the group receives the full set of machine identifiers for the group. Thus, the network controllers at the sites spanned by the group but not in the location criteria specified by the group definition will also receive the full set of machine identifiers for the group, although none of those machines are located at their site.

As noted, the group definition in some embodiments is part of a global logical network configuration. In some embodiments, the global logical network configuration includes definitions of domains, which are groups of sites used for defining security policy. Within the global configuration, a group is defined within a domain, and the span in the group definition is inherited from the span of the domain in some embodiments. That is, the set of sites spanned by a group is the group of sites defined for the domain in which the group is defined.

A primary purpose of the groups, in some embodiments, is for use in security policies (e.g., firewall rules). These security policies specify rules for traffic that should be allowed, blocked, or dropped within the network, and are defined based on source and destination addresses. Rather than requiring a network security administrator to define rules using the actual network addresses of large numbers of machines, the administrator can define the rules in terms of groups (e.g., allow or drop traffic sent from Group 1 to Group 2). As described above, the network controllers translate the group definitions into sets of machine identifiers (e.g., addresses), and in some embodiments also use the sets of addresses to translate the security rules into rules that can be applied by the physical network elements that implement the logical network. Using site location as a criterion for the groups allows the network elements at a first site to apply different rules for traffic sent to or from machines located at a second site spanned by the group (i.e., in the same domain as the first site) without including in those rules machines at the first site that would otherwise meet the criteria.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 12 conceptually illustrates a set of security rules defined within the domain of FIG. 11.

DETAILED DESCRIPTION

Figure 1:
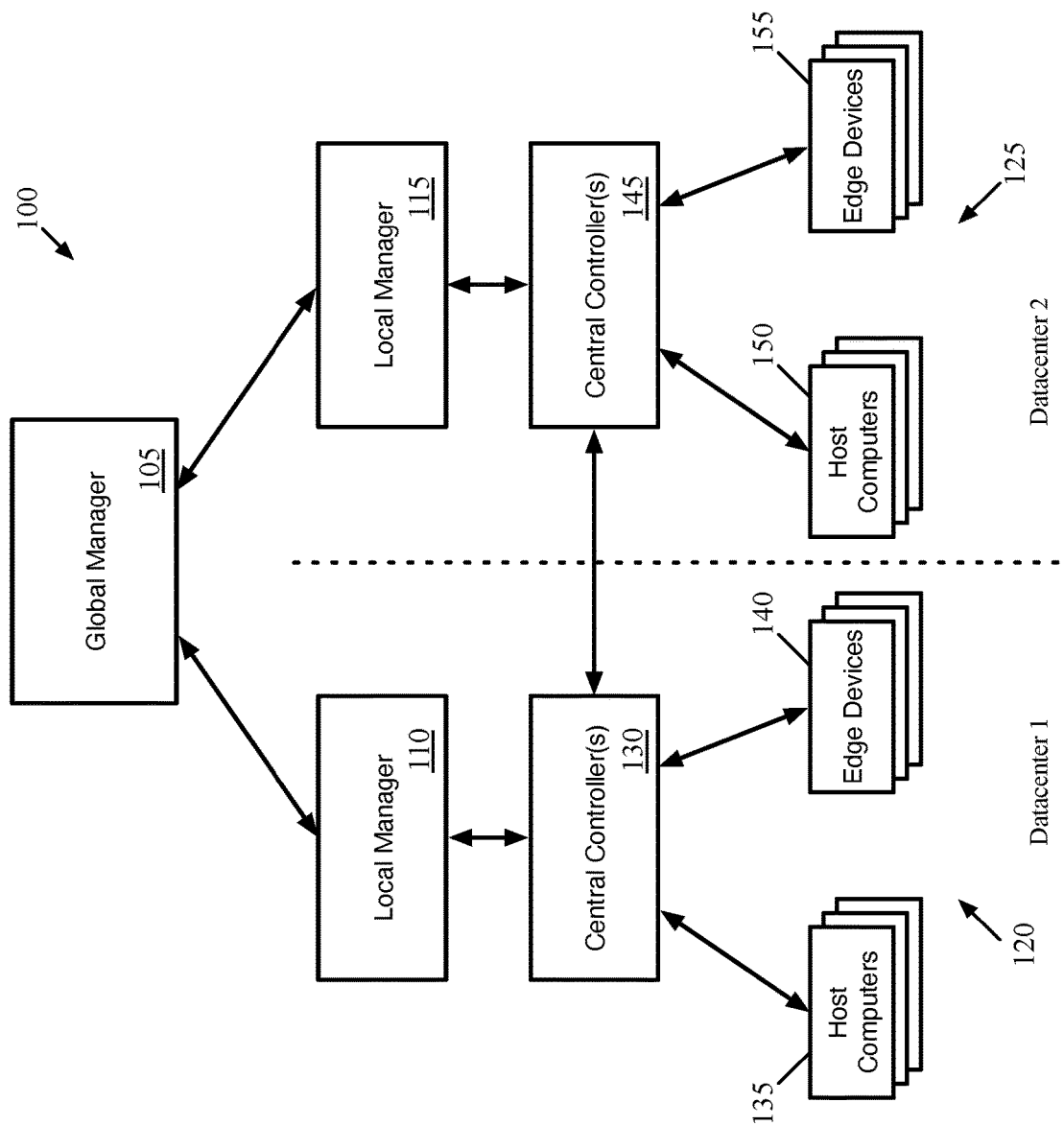
FIG. 1 conceptually illustrates a network management and control system of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a logical network spanning multiple federated sites (e.g., multiple datacenters), some embodiments of the invention provide a method for defining a group of machines and distributing the group definition (e.g., for a security group) to at least a subset of the sites. In some embodiments, the group definition includes both (i) a span of the group that specifies a set of the sites at which the group is to be used and (ii) a set of criteria for machines to be included in the group. This set of criteria, in some embodiments, includes location criteria specifying one or more sites at which machines must be located in order to be members of the group. Other criteria can include machine characteristics (e.g., a specific type of operating system running on the machine, applications executing on the machine, machines running on a specific type of hypervisor, etc.), machine names in the management system, machine metadata in the management system, etc. The group definition is distributed to each site in the set of sites, and local network control systems at each of these sites determine the set of machines in the group based on the specified set of criteria (i.e., by identifying machines that match the set of criteria defined for the group).

In some embodiments, the group definition is received by a global manager that manages the entire logical network across the multiple sites. This global manager is part of a network management and control system along with the local network control systems at each of the individual sites, and distributes the group definition to local network managers at each site in the set of sites. The network management and control system of some embodiments includes (i) a global network manager that manages the entire logical network spanning all of the sites, (ii) local network managers at each site that directly manage the logical network at their respective sites, and (iii) central controllers at each site for distributing logical network configuration data to computing devices at the site that implement the logical network. The global manager receives global logical network configuration data (e.g., from a network administrator), while the local network managers receive (i) global logical network configuration data for their respective sites from the global manager and (ii) local logical network configuration data (e.g., from a network administrator). This global logical network configuration includes the group definition in some embodiments, which is included in the relevant global logical network configuration data provided to the local network managers for each site in the set of sites by the group. In some embodiments, a network management application is provided that allows the network administrator to access the global manager as well as some or all of the local managers via the same user interface (UI).

The logical network, in some embodiments, is a conceptual network structure that a network administrator (or multiple network administrators) defines through a set of network managers. Specifically, some embodiments include a global manager as well as local managers for each site. FIG. 1 conceptually illustrates such a network management and control system 100 of some embodiments. This network management and control system 100 includes a global manager 105 as well as local managers 110 and 115 at each of two datacenters 120 and 125 that are spanned by the logical network. The first datacenter 120 includes central controllers 130 as well as host computers 135 and edge devices 140 in addition to the local manager 110, while the second datacenter 125 includes central controllers 145 as well as host computers 150 and edge devices 155 in addition to the local manager 115.

In some embodiments, the network administrator(s) define the logical network to span a set of physical sites (in this case the two illustrated datacenters 120 and 125) through the global manager 105. In addition, any logical network constructs (such as logical forwarding elements) that span multiple datacenters are defined through the global manager 105. This global manager, in different embodiments, may operate at one of the datacenters (e.g., on the same machine or machines as the local manager at that site or on different machines than the local manager) or at a different site.

The global manager 105 provides data to the local managers at each of the sites spanned by the logical network (in this case, local managers 110 and 115). In some embodiments, the global manager identifies, for each logical network construct, the sites spanned by that construct, and only provides information regarding the construct to the identified sites. Thus, security groups, logical routers, etc. that only span the first datacenter 120 will be provided to the local manager 110 and not to the local manager 115. In addition, LFEs (and other logical network constructs) that are exclusive to a site may be defined by a network administrator directly through the local manager at that site. The logical network configuration and the global and local network managers are described in greater detail below.

The local manager 110 or 115 at a given site (or a management plane application, which may be separate from the local manager) uses the logical network configuration data received either from the global manager 105 or directly from a network administrator to generate configuration data for the host computers 135 and 150 and the edge devices 140 and 155 (referred to collectively in the following as computing devices), which implement the logical network. The local managers provide this data to the central controllers 130 and 145, which determine to which computing devices configuration data about each logical network construct should be provided. In some embodiments, different LFEs (and other constructs) span different computing devices, depending on which logical network endpoints operate on the host computers 135 and 150 as well as to which edge devices various LFE constructs are assigned (as described in greater detail below).

The central controllers 130 and 145, in addition to distributing configuration data to the computing devices, receive physical network to logical network mapping data from the computing devices in some embodiments and share this information across datacenters. For instance, in some embodiments, the central controllers 130 receive tunnel endpoint to logical network address mapping data from the host computers 135 and share this information (i) with the other host computers 135 and the edge devices 140 in the first datacenter 120 and (ii) with the central controllers 145 in the second site 125 (so that the central controllers 145 can share this data with the host computers 150 and/or the edge devices 155). Similarly, in some embodiments, the central controllers 130 identify members of groups (e.g., security groups) in the first datacenter 120 based on information from the host computers 135 and distribute this aggregated information about the security groups to at least the host computers 135 and to the central controllers in the second site 125. The central controller operations for resolving and distributing group information are described in greater detail below.

Figure 2:
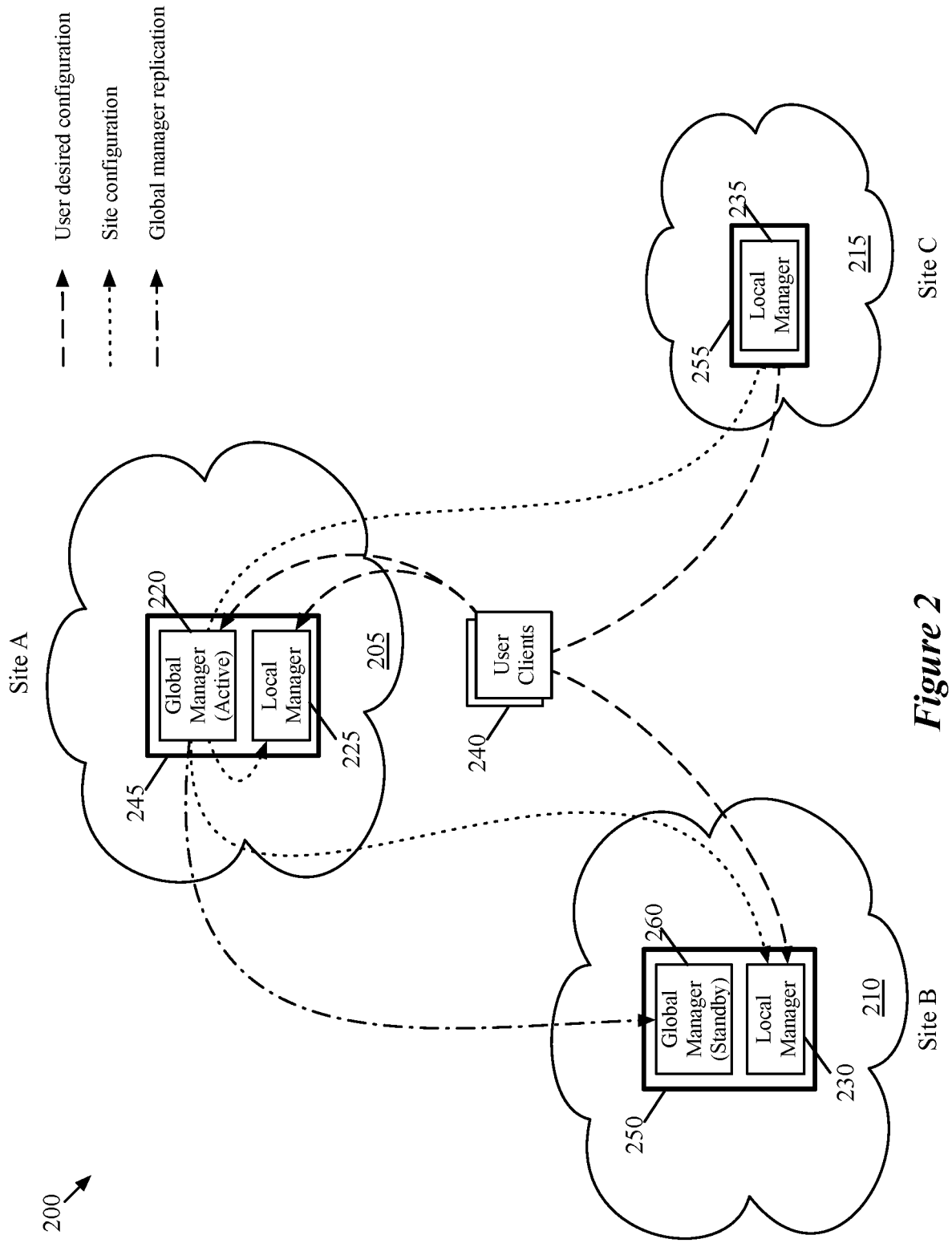
FIGS. 2-4 conceptually illustrate sets of network managers of a network management and control system of some embodiments for a logical network that spans three physical sites.
Figure 3:
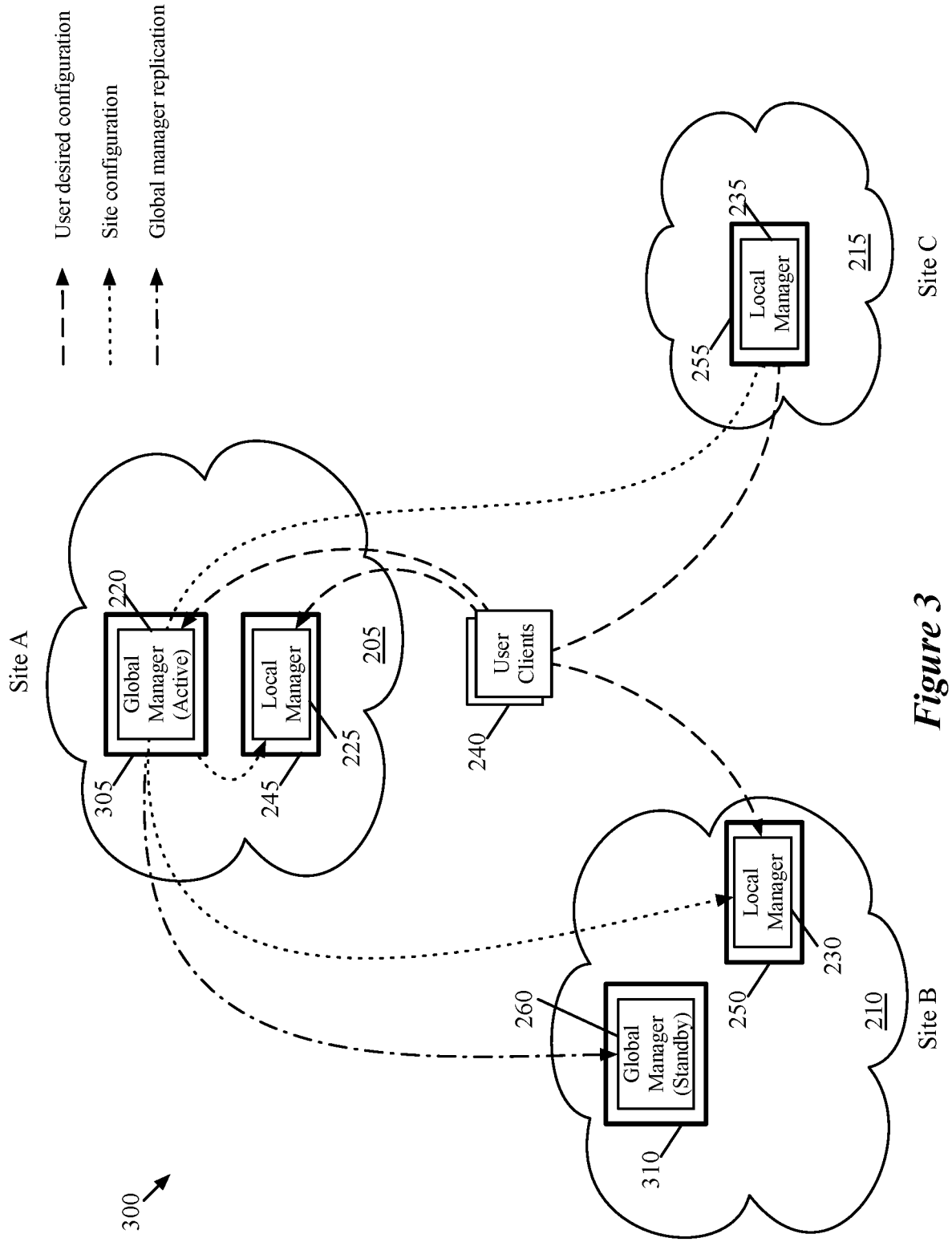
Figure 4:
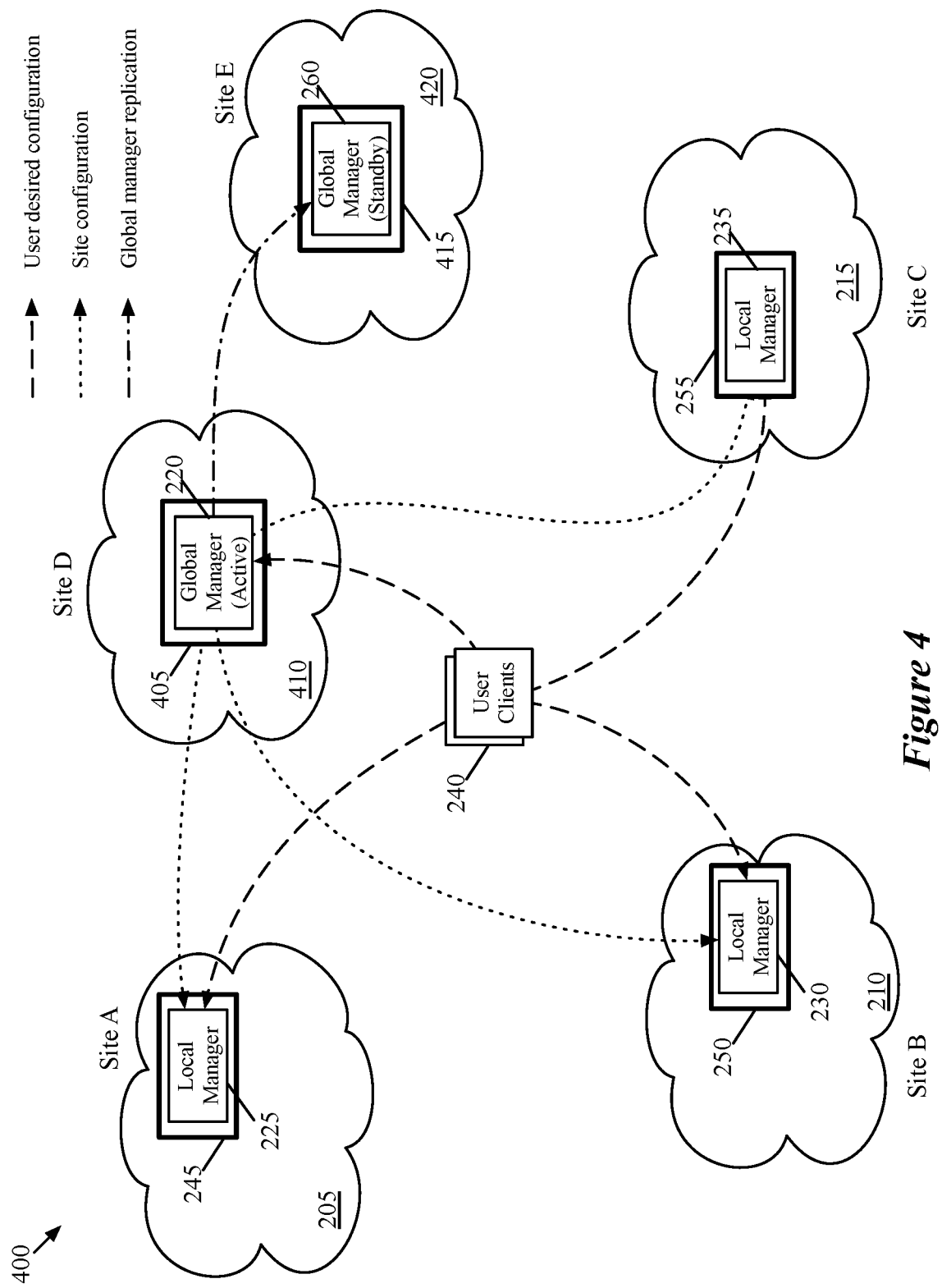

Regarding the global and local managers, FIGS. 2-4 conceptually illustrate sets of network managers of a network management and control system of some embodiments for a logical network that spans three physical sites 205-215. The network management and control system 200 shown in FIG. 2 includes (i) a global manager 220 that manages the entire logical network spanning all of the physical sites 205-215 as well as (ii) the local managers 225-235 for each of the sites that manage the logical network at their respective sites 205-215. Each physical site also includes central controllers, host computers, and edge devices (not shown) in addition to the local manager. In some embodiments, the global manager 220 executes on a computing device 245 at one of the sites 205 spanned by the logical network, and the local managers 225-235 also execute on computing devices 250-255 at their respective sites 210-215.

The global manager receives a global desired configuration for the logical network via one or more user clients 240. Each of the local managers 225-235 may also receive in some embodiments a (site-specific) desired configuration for the logical network via the user clients 240. The desired configuration is provided to the managers 220-235 from a user client 240 in some embodiments using a representational state transfer (REST) application programming interface (API), and is represented by dashed lines in FIG. 2. The global manager 220 also provides a site-specific portion of the global desired configuration to each of the local managers 225-235, as represented by dotted lines in FIG. 2.

In some embodiments, as illustrated in FIG. 2, the global manager 220 executes on the same computing device 245 at a given physical site 205 as the local manager 225 managing that site. The global manager and the local manager at the same site are in some embodiments separate modules of a single application, and share a database (e.g., a distributed database) stored at the site of the global manager. In other embodiments, as illustrated in FIG. 3, the global manager 220 executes on a computing device 305 at a given physical site 205 separately from any local manager 225 managing that site (though they may nevertheless share a distributed database). In still other embodiments, as illustrated in FIG. 4, the global manager 220 executes on a computing device 405 at a separate site 410 that is not spanned by the logical network, and therefore has no local managers for that logical network.

Some embodiments employ a secondary (standby) global manager 260, in an active-standby arrangement with the primary (active) global manager 220. The primary global manager 220 is asynchronously synchronized with the secondary global manager 260 as a standby for failover scenarios. This asynchronous replication is represented by a dot-dash line in FIG. 2. For resiliency, the secondary global manager 260 is located at a different physical site 210 than the site 205 where the active global manager 220 is located and maintains an independent database from the primary global manager 220. This ensures that a failover scenario due to connectivity issues to the primary global manager's physical site does not also automatically affect the secondary global manager's physical site and exploits the multisite architecture of the federated logical network.

The secondary global manager 260 executes in some embodiments on the same computing device 250 as a local manager 230 managing its site 210, as illustrated in FIG. 2. In other embodiments, as illustrated in FIG. 3, the secondary global manager 260 executes on a different computing device 310 at its physical site 210, separately from any local manager 230 managing that site. In still other embodiments, as illustrated in FIG. 4, the secondary global manager 260 executes on a computing device 415 at a separate site 420 that is not spanned by the logical network, and therefore has no local managers (but is nevertheless different than the location of the active global manager 220). Even though FIGS. 2-4 illustrate examples where the primary global manager 220 and the secondary global manager 260 have identical hosting arrangements, in some embodiments any combination or permutation of hosting may be employed as required. As just one example, the primary global manager 220 may be co-located with a local manager (as in FIG. 2), and the secondary global manager 260 may execute at a physical site that is not spanned by the logical network (as in FIG. 4).

The primary global manager 220, the secondary global manager 260, and the local managers 225-235 are in some embodiments separate modules of a single application, and in other embodiments are separate applications. These applications in some embodiments execute as one or more processes within machines that execute on host computers at each physical site. Some embodiments deploy one or more of the managers 220-235 and 260 as a cluster of machines at their physical site, with each machine executing on a different computing device at the same site.

It should be noted that while the above figures illustrate the user clients 240 directly connecting to the global manager 220 and the local managers 225-235, in other embodiments the user clients only directly access the global manager 220 (so long as the application has provided proper authentication information for the global manager). To access the local managers in such embodiments, the global manager acts as a proxy—that is, the application client accesses the local managers through the global manager in some embodiments.

Before describing the global (and local) configurations of some embodiments, the logical networks described by these configurations, as well as their physical implementation across multiple sites, will be described further. The logical network of some embodiments may include both logical switches (to which logical network DCNs attach) and logical routers. Each LFE (e.g., logical switch or logical router) is implemented across one or more datacenters, depending on how the LFE is defined by the network administrator. In some embodiments, the LFEs are implemented within the datacenters by managed forwarding elements (MFEs) executing on host computers that also host DCNs of the logical network (e.g., with the MFEs executing in virtualization software of the host computers) and/or on edge devices within the datacenters. The edge devices, in some embodiments, are computing devices that may be bare metal machines executing a datapath and/or computers on which DCNs execute to a datapath. These datapaths, in some embodiments, perform various gateway operations (e.g., gateways for stretching logical switches across datacenters, gateways for executing centralized features of logical routers such as performing stateful services and/or connecting to external networks).

Figure 5:
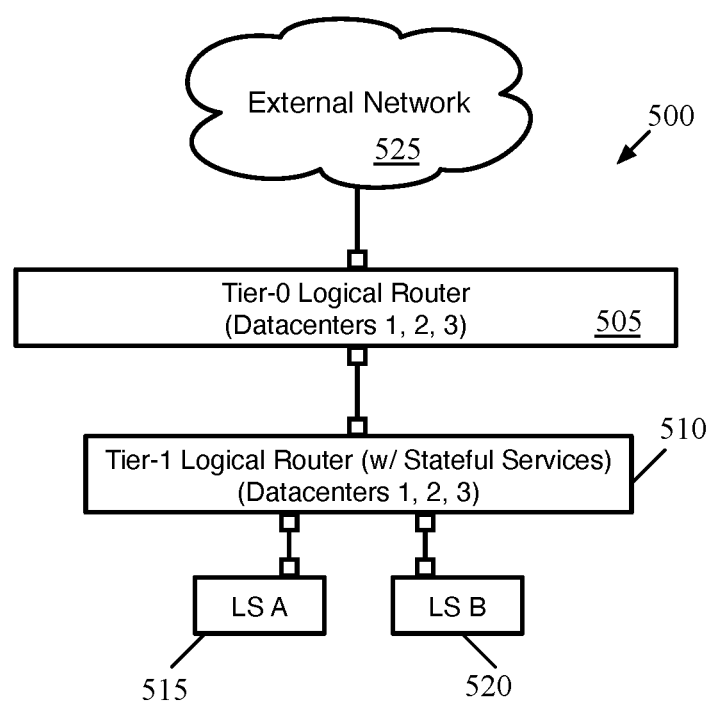
FIG. 5 conceptually illustrates a simple example of a logical network of some embodiments.

FIG. 5 conceptually illustrates a simple example of a logical network 500 of some embodiments. This logical network 500 includes a tier-0 (T0) logical router 505, a tier-1 (T1) logical router 510, and two logical switches 515 and 520. Though not shown, various logical network endpoint machines (e.g., VMs, containers, or other DCNs) attach to logical ports of the logical switches 515 and 520. These logical network endpoint machines execute on host computers in the datacenters spanned by the logical switches to which they attach. In this example, both the T0 logical router and the T1 logical router are defined to have a span including three datacenters. In some embodiments, the logical switches 515 and 520 inherit the span of the logical router 510 to which they connect.

As in this example, logical routers, in some embodiments, may include T0 logical routers that connect directly to external networks (e.g., router 505) and T1 logical routers that segregate a set of logical switches from the rest of the logical network and may perform stateful services for endpoint machines connected to those logical switches (e.g., router 510). These logical routers, in some embodiments, are defined by the network managers to have one or more routing components, depending on how the logical router has been configured by the network administrator.

Figure 6:
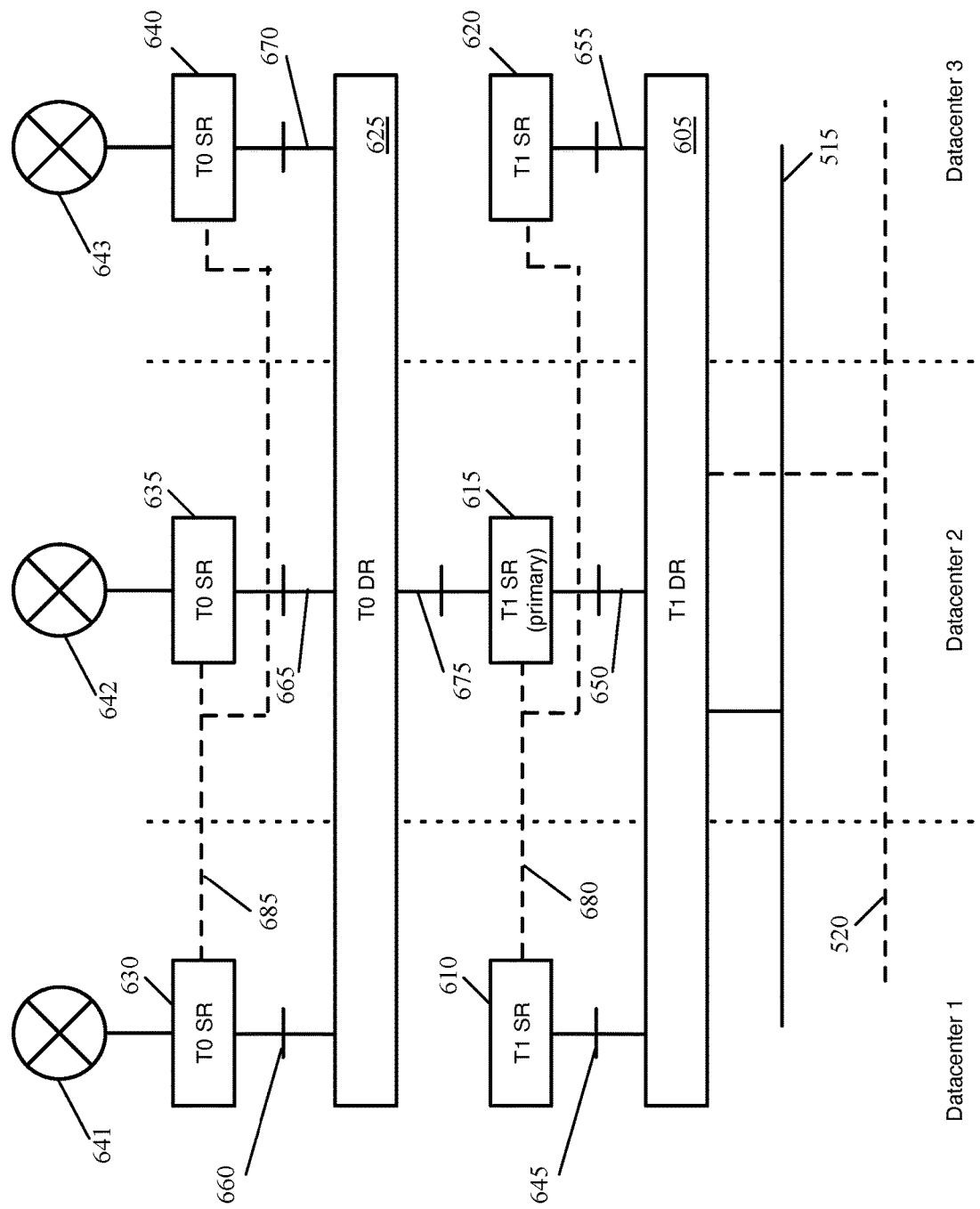
FIG. 6 conceptually illustrates the logical network of FIG. 5 showing the logical routing components of the logical routers as well as the various logical switches that connect to these logical components and that connect the logical components to each other.

FIG. 6 conceptually illustrates the logical network 500 showing the logical routing components of the logical routers 505 and 510 as well as the various logical switches that connect to these logical components and that connect the logical components to each other. As shown, the T1 logical router 510 includes a distributed routing component (DR) 605 as well as a set of centralized routing components (also referred to as service routers, or SRs) 610-620. T1 logical routers, in some embodiments, may have only a DR, or may have both a DR as well as SRs. For T1 logical routers, SRs allow for centralized (e.g., stateful) services to be performed on data messages sent between (i) DCNs connected to logical switches that connect to the T1 logical router and (ii) DCNs connected to other logical switches that do not connect to the tier-1 logical router or from external network endpoints. In this example, data messages sent to or from DCNs connected to logical switches 515 and 520 will have stateful services applied by one of the SRs 610-620 of the T1 logical router 510 (specifically, by the primary SR 615).

T1 logical routers may be connected to T0 logical routers in some embodiments (e.g., T1 logical router 510 connecting to T0 logical router 505). These T0 logical routers, as mentioned, handle data messages exchanged between the logical network DCNs and external network endpoints. As shown, the T0 logical router 505 includes a DR 625 as well as a set of SRs 630-640. In some embodiments, T0 logical routers include an SR (or multiple SRs) operating in each datacenter spanned by the logical router. In some or all of these datacenters, the T0 SRs connect to external routers 641-643 (or to top of rack (TOR) switches that provide connections to external networks).

In addition to the logical switches 515 and 520 (which span all of the datacenters spanned by the T1 DR 605), FIG. 6 also illustrates various automatically-defined logical switches. Within each datacenter, the T1 DR 605 connects to its respective local T1 SR 610-620 via a respective transit logical switch 645-655. Similarly, within each datacenter, the T0 DR 625 connects to its respective local T0 SR 630-640 via a respective transit logical switch 660-670. In addition, a router link logical switch 675 connects the primary T1 SR 615 (that performs the stateful services for the T1 logical router) to the T0 DR 625. In some embodiments, similar router link logical switches are defined for each of the other datacenters but are marked as down.

Lastly, the network management and control system also defines backplane logical switches that connect each set of SRs. In this case, there is a backplane logical switch 680 connecting the three T1 SRs 610-620 and a backplane logical switch 685 connecting the three T0 SRs 630-640. These backplane logical switches, unlike the transit logical switches, are stretched across the datacenters spanned by their respective logical routers. When one SR for a particular logical router routes a data message to another SR for the same logical router, the data message is sent according to the appropriate backplane logical switch.

Figure 7:
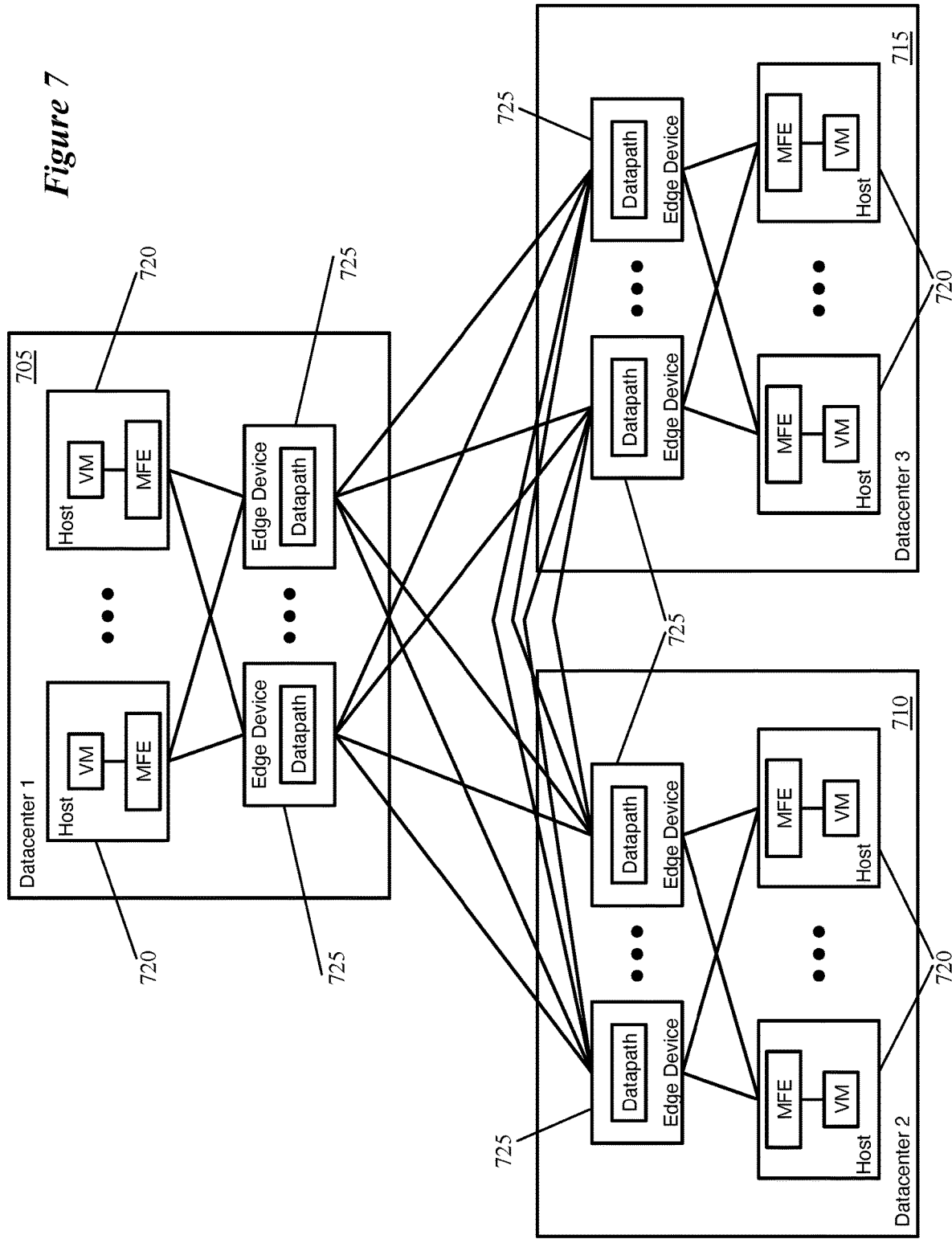
FIG. 7 conceptually illustrates three datacenters spanned by the logical network of FIG. 2 with the host computers and edge devices that implement the logical network.

As mentioned, the LFEs of a logical network may be implemented by MFEs executing on source host computers as well as by the edge devices. FIG. 7 conceptually illustrates the three datacenters 705-715 spanned by the logical network 500 with the host computers 720 and edge devices 725 that implement the logical network. VMs (in this example) or other logical network endpoint DCNs operate on the host computers 720, which execute virtualization software for hosting these VMs. The virtualization software, in some embodiments, includes the MFEs such as virtual switches and/or virtual routers. In some embodiments, one MFE (e.g., a flow-based MFE) executes on each host computer 720 to implement multiple LFEs, while in other embodiments multiple MFEs execute on each host computer 720 (e.g., one or more virtual switches and/or virtual routers). In still other embodiments, different host computers execute different virtualization software with different types of MFEs. Within this application, "MFE" is used to represent the set of one or more MFEs that execute on a host computer to implement LFEs of one or more logical networks.

The edge devices 725, in some embodiments, execute datapaths (e.g., data plane development kit (DPDK) datapaths) that implement one or more LFEs. In some embodiments, SRs of logical routers are assigned to edge devices and implemented by these edge devices (the SRs are centralized, and thus not distributed in the same manner as the DRs or logical switches). The datapaths of the edge devices 725 may execute in the primary operating system of a bare metal computing device and/or execute within a VM or other DCN (that is not a logical network endpoint DCN) operating on the edge device, in different embodiments.

In some embodiments, as shown, the edge devices 725 connect the datacenters to each other (and to external networks). In such embodiments, the host computers 720 within a datacenter can send data messages directly to each other but send data messages to host computers 720 in other datacenters via the edge devices 725. When a source DCN (e.g., a VM) in the first datacenter 705 sends a data message to a destination DCN in the second datacenter 710, this data message is first processed by the MFE executing on the same host computer 720 as the source VM, then by an edge device 725 in the first datacenter 705, then an edge device 725 in the second datacenter 710, and then by the MFE in the same host computer 720 as the destination DCN.

Returning to the global logical network configuration, this configuration is expressed and stored by the global manager as a hierarchical tree (also referred to as a global policy tree) with nodes and connections between the nodes in some embodiments. Some embodiments define a root node for the global logical network (also referred to as a federation) and add nodes for both physical sites and logical network entities as child nodes of the root node.

For logical network entities (e.g., logical network elements and/or security groups and policies), when the network administrator creates a new logical network entity, the global manager creates one or more nodes in the policy tree for the entity. In some embodiments, these logical network entities can include logical network elements that span one or more sites and logical network policies that apply to those elements, and the connections represent relationships between the nodes (e.g., parent-child relationships, logical network connections, etc.). The logical network elements include logical forwarding elements (e.g., logical routers, logical switches, etc.) as well as logical constructs. The logical constructs may include logical groupings of one or more sites used to define security policy, groups of logical network endpoint machines that share one or more attributes (e.g., location criteria, a specific operating system, etc.), logical ports associated with the logical forwarding elements, etc.

The logical network policies include forwarding policies, service policies, and security policies, and are applied in some embodiments to govern the behavior of the logical forwarding elements. The policies can be child nodes of a logical network element node, in some embodiments (e.g., static routing policy configuration for a logical router, security policies defined within a logical grouping of sites). In addition, the policies may refer to and be defined in terms of the logical constructs. For instance, security policies may be defined by reference to the groups of logical network endpoint machines in some embodiments.

The primary global manager stores the global policy tree in its database, while the secondary global manager stores a replicated global policy tree in its own database. In some embodiments, the nodes represent logical network elements that span one or more sites and logical network policies that apply to those elements, and the connections represent relationships between the nodes (e.g., parent-child relationships, logical network connections, etc.). Cross-referencing between nodes is achieved by reference to a path through the tree's hierarchy which provides information about the span of each node.

Figure 8:
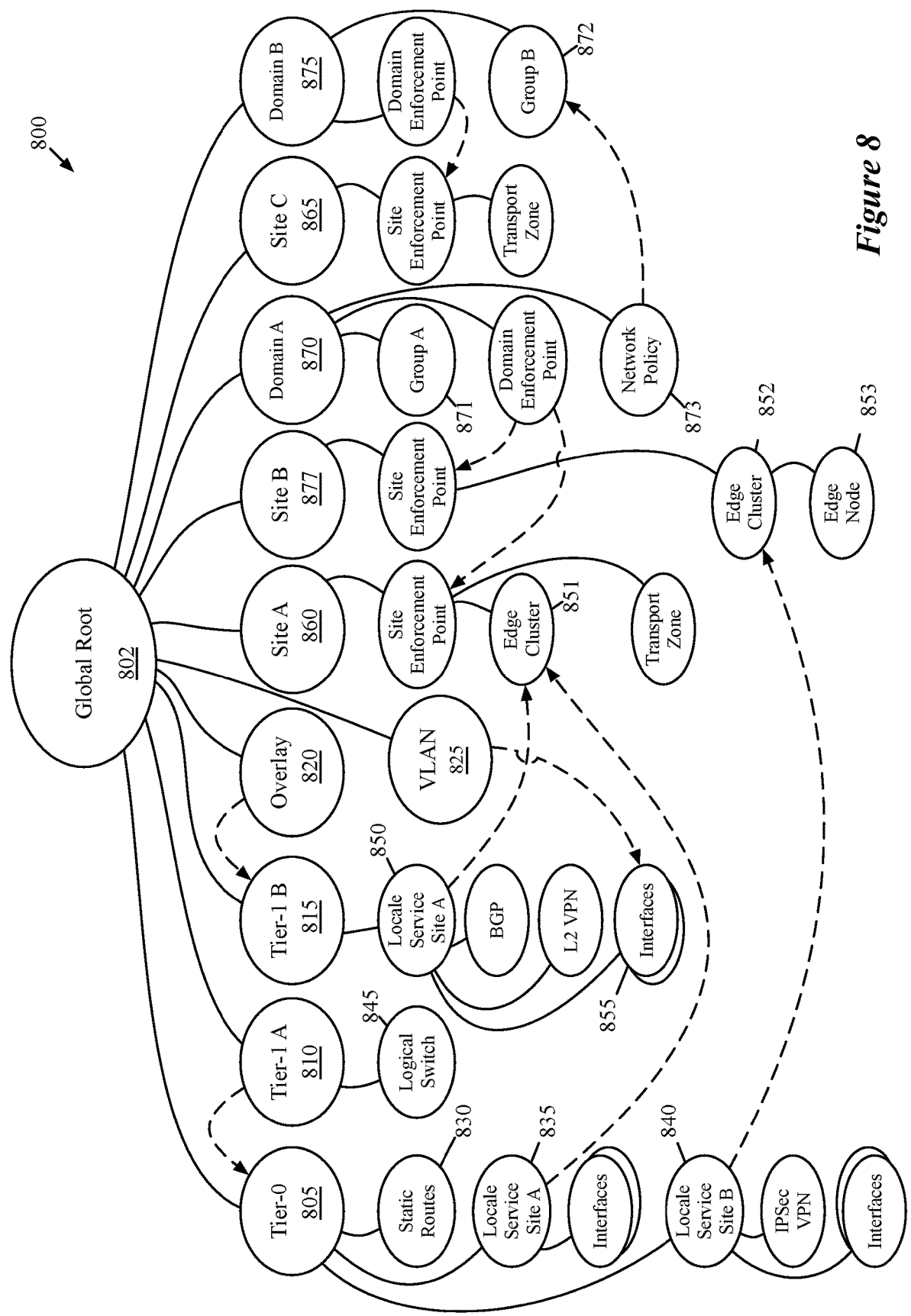
FIG. 8 conceptually illustrates an example of a global policy tree of some embodiments for a logical network that spans multiple physical sites.

FIG. 8 conceptually illustrates an example of such a global policy tree 800 of some embodiments, for a logical network that spans multiple physical sites. In some embodiments, a global root node 802 represents the overall federated logical network configuration. Portions of the global policy tree represent logical network elements, including logical forwarding elements (e.g., logical routers, logical switches, etc.). For example, in FIG. 8, the global policy tree root 802 connects a single Tier-0 logical router T0 805, two Tier-1 logical routers T1A 810 and T1B 815, and two different types of network segments. These segments are an overlay network segment 820 and a VLAN segment 825. The node for router T0 805 has a number of child nodes, including static route definitions 830 and locale services 835 and 840 referencing physical sites A and B. In this example, the router T0 805 also spans site C, but for the sake of simplicity the corresponding locale services referencing site C are not shown in the figure. The node for router T1A 810 has a child node for a logical switch 845. The node for router T1B 815 has a child node for a locale service 850 referencing physical site A.

The locale service nodes for the T0 router and the T1 routers define these routers' span. For example, router T0 805 spans sites A, B, and C, while router T1B 815 spans site A. As more locale services are added to a T0 or T1 router, the router is stretched to the corresponding sites. Unlike router T1B 815, router T1A 810 does not have a locale service child node, and instead has a reference (dashed line) to router T0 805. Therefore, router T1A 810 inherits the span of router T0 805, i.e., router T1A spans sites A, B, and C. Certain child nodes also inherit that span automatically in some embodiments. Accordingly, the static route definitions 830 under the T0 router also span sites A, B, and C. The logical switch 845 inherits the span of its parent router T1A 810, which in turn derives its span from the reference to router T0 805. Therefore, logical switch 845 also spans sites A, B, and C.

Each node in the global policy tree 800 has multiple attributes that define configuration parameters, some of which are defined by the user and others of which are inherited. In some embodiments, span is not the only attribute that is inherited by a child node from a parent node. For example, certain T0 or T1 routers that span more than one site have one of the physical sites assigned as a primary site, with the other sites being secondary sites. If such a logical router has multiple service router (SR) components, then the SR component at the primary site takes precedence for certain operations. This configuration is specified (e.g., by an administrator of the network) for the router and is not part of the configuration of the locale services under the router.

The locale service nodes 835, 840, and 850 have references (dashed lines) to edge clusters 851 and 852 at the respective sites A and B. As noted above, in this example the T0 router 805 also spans site C, but the router's locale service for that site and therefore the corresponding reference to an edge cluster under the site C node 865 are omitted for the sake of visual clarity. The locale service nodes are associated in some embodiments with the service routers described above with reference to FIG. 6. Edge clusters are described below with reference to site nodes. The local service nodes also have various types of child nodes in some embodiments, defining various different types of configuration information available at the respective site, including interfaces (e.g., logical ports), L2 VPNs, BGP services, and IPsec VPNs. Even though locale services are child nodes of other elements, they do not necessarily inherit the full span of those elements. A locale service node has the span of the single site in some embodiments (i.e., the site of the edge cluster node referenced by the local service node), so all child nodes only inherit the span of the single site to which the local service node refers.

The logical switch 845 is shown as a child node under router T1A 810. Such logical switches, also referred to as segments, are restricted to the parent router if they are connected as child nodes (as in FIG. 8). However, in some embodiments logical switches are also directly connected to the global root 802. For example, overlay segment 820 is directly connected to the global root 802, and has a reference (dashed line) to router T1B 815. This allows the overlay segment to be moved to a different router if desired, by simply changing the reference to another logical router at the top level below global root 802. The overlay router 820 inherits the span of router T1B 815, e.g., site A, but the overlay router could be stretched automatically if another locale service were to be added to router T1B 815.

Another type of segment in some embodiments is a VLAN-backed segment. These are defined with respect to a transport zone, which is a group of host devices at a single physical site. Therefore, the VLAN-backed segment can only span that single site where the transport zone is defined. In some embodiments, VLAN-backed segments are used as uplinks in some embodiments, to connect a logical router to an external physical router outside the logical network. In other words, the VLAN is between the T0 router and the external router. Since multiple T0 routers may connect to the same external physical router, VLAN-based segments are used in some embodiments to distinguish their traffic. Typically, connecting a logical T0 router to physical router happens at a single physical site, since each site has its own connection to the wide-area network (e.g., the Internet) between the sites, i.e., a unique Internet Service Provider (ISP). Accordingly, VLAN backed segments provide a way of logically isolating traffic from different T0 routers to the same external router, even though the T0 routers may be stretched across multiple sites and overlap in their span.

In the example of FIG. 8, VLAN segment 825 has a reference (dashed line) to an interface 855 of the locale service 850 under router T1B 815. The interface 855 is limited to the span of the locale service 850, so by connecting the VLAN segment 825 to the interface 855, the span of the VLAN segment is limited to only site A as required. If another locale service were to be added under router T1B, then the span of router T1B would stretch to include the new site, but the span of VLAN segment 825 would be unchanged since its reference is to the interface 855 of the local service 850.

Interfaces in some embodiments are uplinks or service ports. Interfaces connect to logical switches or segments, and then logical network endpoints (such as virtual machines, data compute nodes, or other types of workloads) are attached to those logical switches and segments. These endpoints also have their own services, such as DNS, TCP, etc.

In addition, the global policy tree 800 include nodes for each physical site. For example, in FIG. 8, there are nodes for site A 860, site B 877, and site C 865 under the global root 802. Each site has an enforcement point child node, under which specific resources are assigned, such as edge clusters, transport zones, etc. In the example, site A's edge cluster 851 has incoming references from locale services 835 attached to router T0 805 and from locale services 850 attached to router T1B 815. The edge cluster 852 at site B has an incoming reference from the locale services 840 attached to router T0 805. In some embodiments, edge clusters also have children corresponding to specific edge nodes 853, which actually implement the SRs and execute services such as firewalls, DHCP, etc. In some embodiments, the global manager identifies the physical structure of a site (and therefore the structure of the child nodes for the site in the global policy tree 800) via auto-discovery, when the site is added to the federation represented by the global root node 802.

The logical network elements also include security constructs in some embodiments, such as domains that are logical groupings of one or more sites (e.g., geographic regions), and groups of logical network endpoints that share one or more attributes (e.g., operating system, region, site location, etc.). Domains are defined and represented as nodes in the global policy tree 800 beneath the global root 802. The domains are defined in some embodiments at the global manager (e.g., by an administrator of the logical network). Unlike sites, which represent a physical construct, domains are a logical construct, which serve as an envelope to group different logical entities together (e.g., for security purposes). For example, firewall policies or other policy micro-segmentation applied to the domain will automatically be applied to all groups of logical endpoints defined within the domain in some embodiments.

In some embodiments, the logical network configuration (and therefore the global policy tree) includes different types of domains. For example, some domains are specific to a single physical site, and are referred to as locations. This type of domain acts as the container for all site-wide and site-specific configuration and policies. In some embodiments, a location domain is automatically created for each physical site in the federated logical network and cannot be modified by the user.

Other domains are logical groups of one or more sites and are referred to as regions. Regions can be assigned to geographic regions with multiple sites in some embodiments. For example, in FIG. 2, physical site A 205 may be in Paris, physical site B 210 in London, and physical site C 215 in New York. These correspond to the site nodes A 860, B 877, and C 865 in the example of FIG. 8, respectively. One region can then be defined (e.g., Europe), which includes physical sites A and B, and a different region defined (e.g., North America) which includes physical site C. This is useful for example in case there are different regulatory environments (e.g., the European Union's General Data Protection Regulation, or GDPR). Regions and locations, like all domains, are attached to global root 802 and are not attached to other domains as child nodes. Some embodiments restrict each physical site to membership in a single location and a single region. In other words, a location may not have more than one physical site, and a physical site may not be a member of two regions.

In some embodiments, domains are only created as top-level nodes beneath the global root 802 and cannot be children of other domains or inherit span from other domains. Instead, the span of a domain is manually defined in some embodiments at the global manager (e.g., by an administrator of the logical network) as the sites that are members of the domain. The span is represented in some embodiments by a domain enforcement point, which is configured to reference the site enforcement point for whichever sites the domain is intended to span. For example, in FIG. 8, the domain enforcement point for domain A 870 references the site enforcement point of site A 860 (e.g., Paris) and the site enforcement point of site B 877 (e.g., London). Therefore, the domain A 870 is a region (e.g., Europe) spanning sites A and B, as well as potentially other sites (e.g., Berlin) that are not shown in FIG. 8. In addition, the domain enforcement point for domain B 875 references the site enforcement point of site C 865 (e.g., New York). Therefore, the domain B 875 spans site C. In this example, domain B 875 is a region (e.g., North America) that may also span other physical sites (e.g., Chicago, Los Angeles, etc.) that are not shown in FIG. 8. Alternatively, domain B is a location that is specific to site C alone. For a given domain, the group of (one or more) site enforcement points that are referenced by the domain's enforcement point is also referred to as a domain deployment map in some embodiments.

In some embodiments, the logical network endpoint machines are logically organized into groups (also referred to as security groups) which can span multiple sites. Service machines as well as managed forwarding elements executing on host computers apply logical network policies (such as network policy 873) to the data messages exchanged between security groups of endpoint machines in some embodiments, based on policy rules that are defined in terms of these groups. Such security groups and network policies are defined at the global manager through the user client 240 (e.g., by an administrator of the logical network). In some embodiments, security groups and network policies are represented in the global policy tree 800 as child nodes of domains, and accordingly inherit their parent domain's span. In some embodiments, the span of a network policy is defined not only by its parent domain, but also by sites and/or domains which are referenced by the policy.

For example, in FIG. 8, domain A 870 has a child node corresponding to security group A 871, which accordingly inherits a span of sites A and B (i.e., the span defined by the domain deployment map of domain A). In addition, domain B 875 has a child node corresponding to security group B 872, which accordingly inherits a span of site C (i.e., the span defined by the domain deployment map of domain B). Domain A 870 also has a child node corresponding to a network policy 873. The network policy is applicable to any groups defined under the same domain (e.g., group A 871). In order to apply a policy to a security group, the span of the security group in some embodiments must include the span of the policy.

In some embodiments, network policies may also refer to security groups that are not in the same domain. For example, the network policy 873 also references security group B 872, which is in domain B 875, even though the domain deployment map for the parent domain A 870 does not include domain B. Security group definitions and their use in network policies are described in further detail below by reference to FIGS. 11 and 12.

In some embodiments, the global manager parses the global policy tree to identify the span of each node in order to generate a policy subtree for each physical site. The global manager identifies the span of each node in the global policy tree, then parses the global policy tree using the identified span for each node to generate the policy subtree for each site. The local manager at each site (or a management plane application, which may be separate from the local manager) uses the relevant portion of the global desired configuration, received from the global manager, along with any desired configuration received directly by the local manager itself, to manage the logical network at the site.

Figure 9:
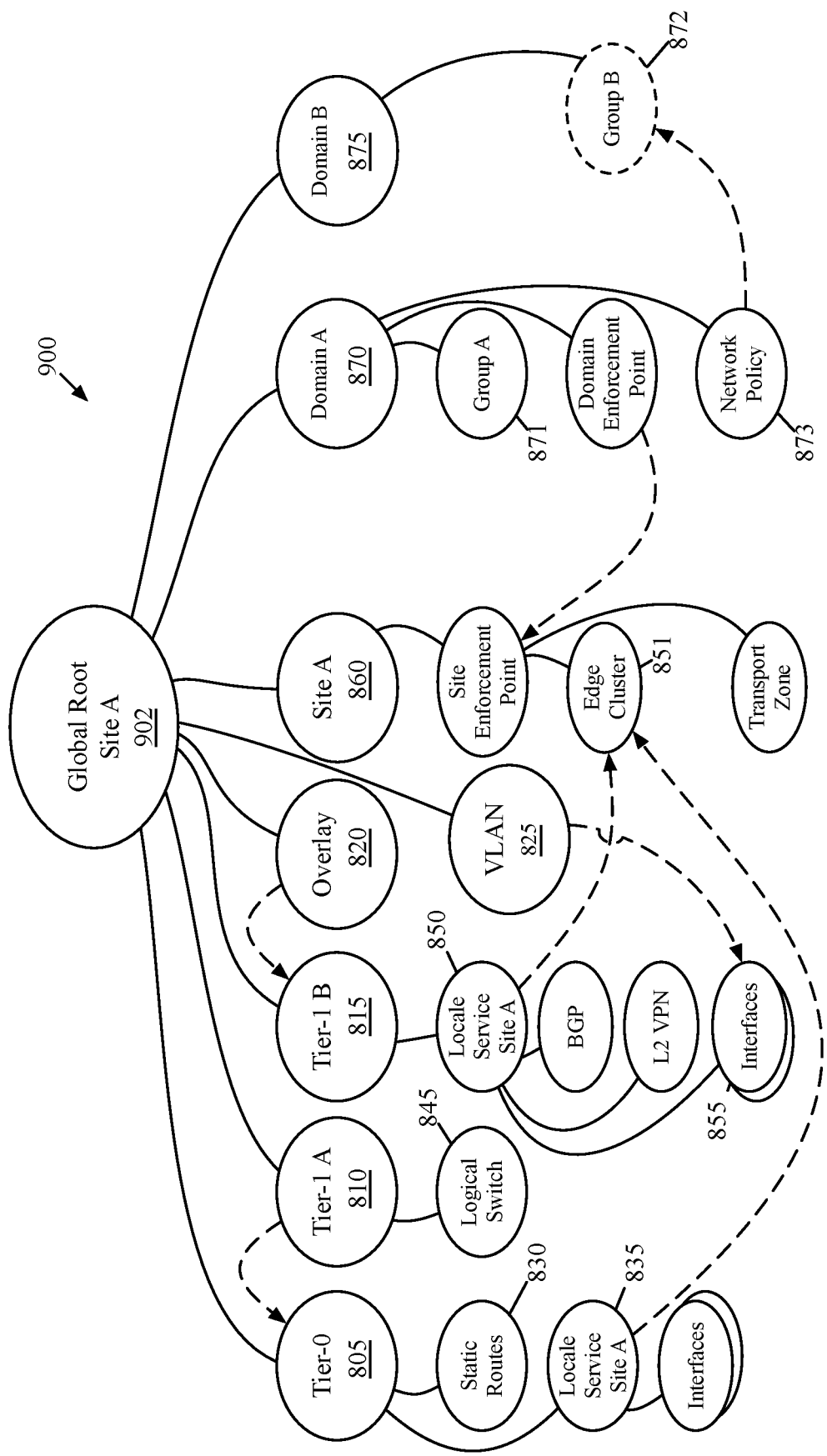
FIG. 9 illustrates a global policy subtree for a physical site based on the global policy tree and stored at the database for local manager for the site.

FIG. 9 illustrates a global policy subtree 900 for the physical site A, based on the global policy tree 800, and stored at the database for local manager for site A. Since the subtree 900 is specific to site A, all top-level nodes below global root 902 with span that includes site A are preserved, while top-level nodes that are only relevant to sites B and/or C are omitted. For example, the top-level node for site B 877, the top-level node for site C 865, and the top-level node for domain B 875 are all omitted, as are all their respective child nodes. In addition, for router T0 805, the locale services node for site B 840 is also omitted. Router T0 805 still spans sites A and B in some embodiments, since its span attribute is associated with its definition at the global manager 220, not the local manager 225.

Network policy 873 is also preserved in the global policy subtree 900. This policy is defined under domain A 870, so in some embodiments it has a span of site A and site B, even though this subtree is specific to site A. In addition, as noted above with reference to FIG. 8, network policy 873 also references group B 872. As a result, the span of the policy also includes site C, even though that site is in a different domain. This reference to group B 872 is also preserved in the policy subtree 900. In some embodiments, domain nodes (e.g., the node for domain B 875) are pushed to the local managers at all sites, or at least all sites at which nodes underneath those domain nodes are required (as is node 872 in this case).

In some embodiments, a local manager also stores a separate policy tree, that is generated based on desired configuration received directly at the local manager instead of from the global manager 220. This local desired configuration is received from a network administrator to define a logical network that is confined to that site (i.e., the span of all of the logical network elements is only the single site). In some embodiments, the logical network elements that an administrator can define for the local logical network are of the same type as the logical network elements that the administrator can define for the global logical network. As described below, this allows the network management application via which the administrator accesses the global and local managers to provide the same UI for the different network managers. The global policy tree is stored in the primary global manager database, and a replica of the global policy tree is also stored in the secondary global manager database. The local policy tree, meanwhile, is not replicated to a different site in some embodiments.

Figure 10:
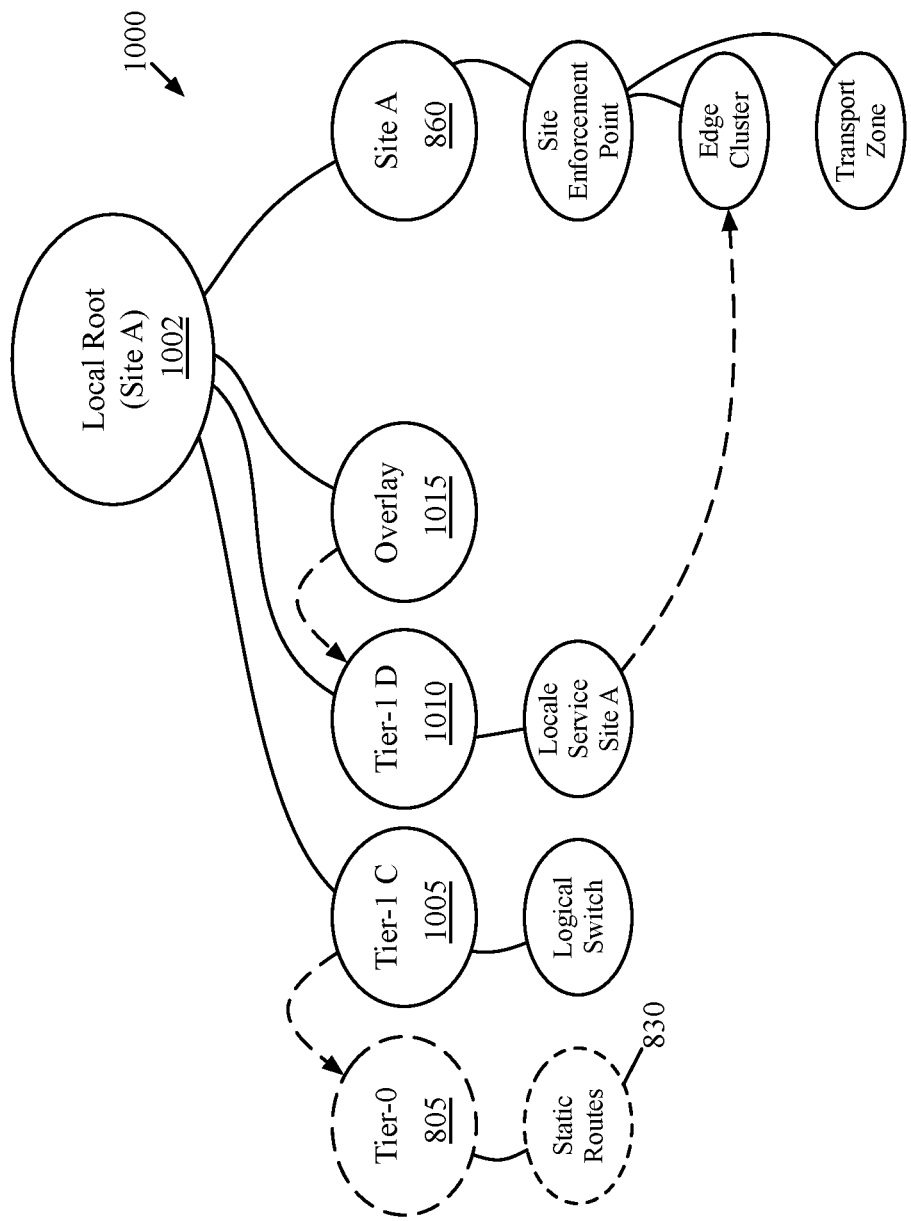
FIG. 10 conceptually illustrates a local policy tree for a site that is distinct from the global policy subtree received from the global manager in some embodiments.

FIG. 10 conceptually illustrates a local policy tree 1000 for site A. This local policy tree is distinct from the global policy subtree 900 received from the global manager in some embodiments. In this example, the local root 1002 of the local policy tree 1000 connects a site node for site A, two Tier-1 logical routers T1C 1005 and T1D 1010, as well as an overlay segment 1015. The overlay segment 1015 includes a reference to the router T1D 1010, which has a locale service corresponding to site A.

In some embodiments, logical network elements defined in the local policy tree 1000 may reference logical network elements defined in the global policy tree 800. For example, the node for the router T1C 1005 references the node for the router T0 805 that was defined from the global manager 220. As a result, data messages sent to the logical router T1C 1005 can be sent to the SRs for the T0 router 805 (e.g., to reach external networks).

As described, the global logical network configuration includes group definitions, which may be defined by reference to domains. Within the global configuration, a group is defined within a domain, and the span in the group definition is inherited from the span of the domain in some embodiments. That is, the set of sites spanned by a group is the group of sites defined for the domain in which the group is defined. It should be noted that, in certain cases, the span of a group can extend beyond its domain if policy defined for other domains of the logical network use the group (in this case, a reference group is defined in the other domains so as to extend the span of the group to that domain). These reference groups are described further in U.S. patent application Ser. No. 16/906,955, now published as U.S. Patent Publication 2021/0314227, which is incorporated herein by reference.

Figure 11:
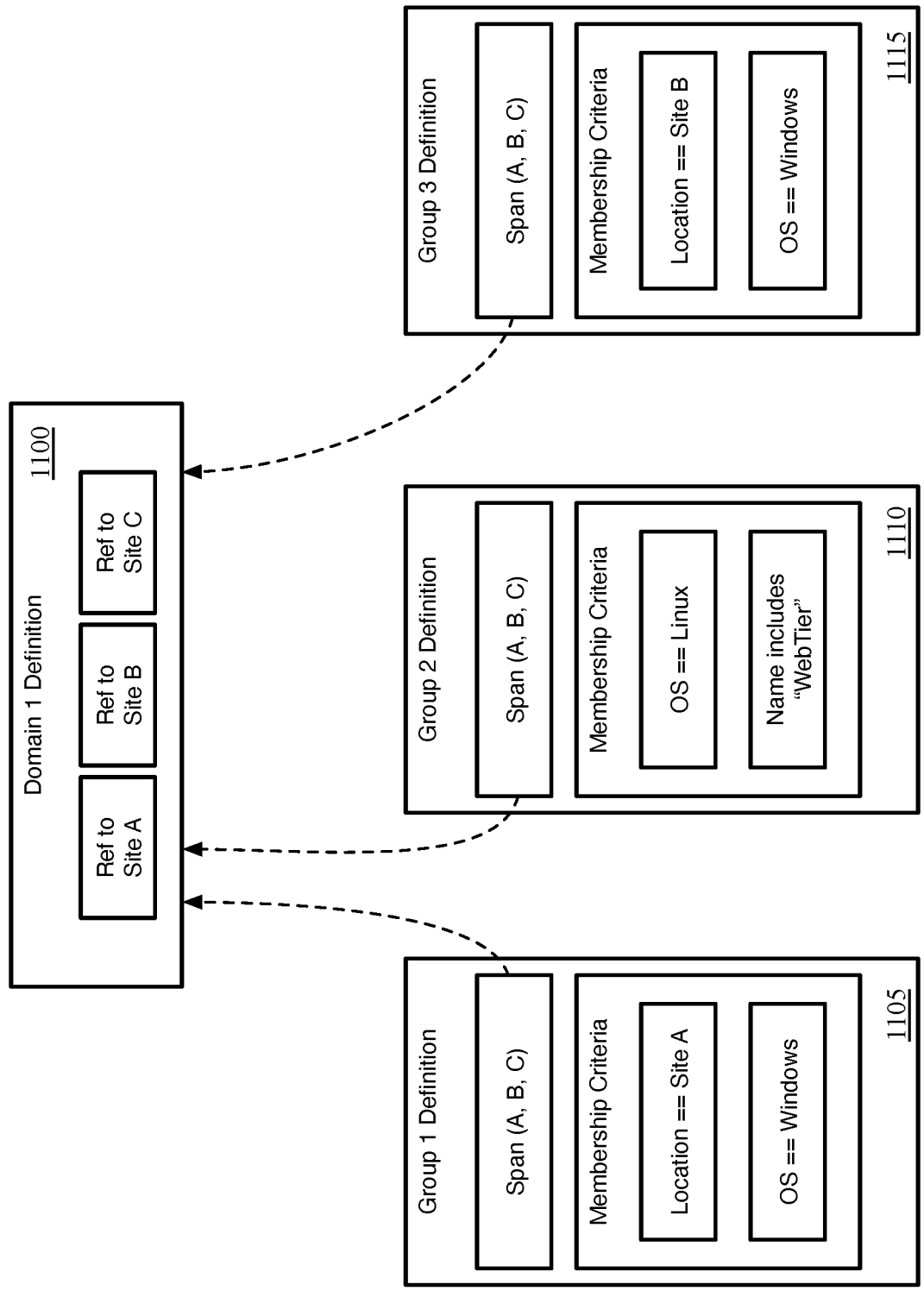
FIG. 11 conceptually illustrates a set of group definitions for a domain according to some embodiments.

FIG. 11 conceptually illustrates a set of group definitions 1105-1115 for a domain according to some embodiments. The domain definition 1100, as received and stored at the global manager, includes references to three physical sites that belong to the domain (sites A, B, and C). As described above, these sites are included in the domain definition 1100 by way of links to site enforcement points in the definitions for each of these three sites.

This figure also illustrates that three groups 1105-1115 are defined within the domain 1100. All three of the group definitions 1105-1115 have spans of sites A, B, and C, by way of their reference to the domain definition 1100. If sites are added to or removed from the domain definition 1100, the spans of these groups would change correspondingly in some embodiments (assuming that the groups are not used by policies in other domains).

In addition, each of the group definitions 1105-1115 includes membership criteria. In some embodiments, groups may be defined statically (e.g., as a pre-specified list of MAC and/or IP addresses) or dynamically (e.g., as a set of criteria, as is the case with groups 1105-1115). Any logical network endpoint machine in the span of the group (i.e., located in any of the sites of the domain 1100) that meets this criteria is dynamically added to the group, as described further below. The criteria for belonging to a group may vary in different embodiments. For instance, these criteria can include attachment to a specific logical switch, an IP address in a particular subnet, the operating system running on a particular VM, the site at which a machine is located, the type of application operating on a machine, a string in a name assigned to a machine in the management and control system, etc.

The first group definition 1105 specifies that any logical network endpoint machine that (i) is located at site A and (ii) runs the Windows operating system is a member of that group. The second group definition 1110 specifies that any logical network endpoint machine that (i) runs the Linux operating system and (ii) has a name including the string "WebTier" is a member of that group. In some embodiments, each logical network endpoint machine has a unique name used by the network management and control system (e.g., provided by the administrator, or through an automated process setup by the administrator) and this name can be used to define security groups. The third group definition 1115 specifies that any logical network endpoint machine that (i) is located at site B and (ii) runs the Windows operating system is a member of that group.

Based on these group definitions 1105-1115, the group membership will be evaluated at all three of sites A, B, and C, and used by the network elements implementing security policies at these sites. However, the membership of Group 1 will only include logical network endpoint machines located at site A and the membership of Group 3 will only include logical network endpoint machines located at site C, whereas the membership of Group 2 can include logical network endpoint machines located at any of the three sites. Thus, for example, if a VM running the Windows operating system is migrated from site A to site B, this VM would be removed from Group 1 and added to Group 3. On the other hand, if a web tier VM running the Linux operating system migrates from one of the sites in the domain to another, this would not affect its status in Group 2. It should also be noted that if the network administrator wanted a group with all of the VMs running Windows in the domain, such a group could be created by not using the location criteria. In this case, VMs running Windows in site A would be added to both Group 1 as well as this additional group, while VMs running windows in site B would be added to both Group 3 as well as this additional group.

As noted above, in some embodiments logical network policies that apply to the logical network elements can also be included in the global logical network configuration. The logical network policies include forwarding policies, service policies, and security policies, and are applied in some embodiments to govern the behavior of the logical forwarding elements (e.g., by governing the behavior of the physical forwarding elements that implement the logical forwarding elements).

Like the groups, these policies are defined in some embodiments at the global manager through a user client (e.g., by an administrator of the logical network). In some embodiments, policies can include one or more security rules which are enforced at the sites on data message flows based on a set of flow attributes. The policies are defined in some embodiments by reference to the groups of logical network endpoint machines by using a group identifier that is assigned at the global manager when the groups are defined. Like the groups, these policy rules are defined within a domain in some embodiments, and are thus enforced within that domain. It should be noted that the security rules can refer to groups and/or endpoint machines that are located both within the domain and outside of the domain in some embodiments (i.e., located in sites spanned by the logical network but not included within the domain where the rule is defined).

FIG. 12 conceptually illustrates a set of security rules 1200 defined within the domain 1100 of FIG. 11. These security rules are enforced by network elements (e.g., operating on host computers and/or edge devices) at the sites spanned by the rules (e.g., the sites belonging to the domain within which the rules are created). In some embodiments, the security rules are defined in terms of a source, a destination, and an action. These rules specify whether data traffic sent from a network address matching the source field to a network address matching the destination field is allowed or should be dropped.

As shown, the first rule specifies that any data traffic that is (i) sent from machines belonging to Group 1 and (ii) directed to machines belonging to Group 3 should be dropped. This rule prevents Windows machines at site A from sending traffic to Windows machines at site B. Without location criteria, such a rule could not be defined in the domain 1100 without blocking all traffic between any Windows VMs. In that situation, a group based on the Windows operating system criteria would include all of the Windows VMs at site A and at site B, which would not be as useful. Separate domains for sites A and B with their own groups for Windows machines could be defined, but the security rule would then have to be defined within one of these domains referencing a group defined in the other domain. Using location as a criteria of the groups (separate from the span of the group) enables various types of security rules that would otherwise not be possible. For instance, a global network administrator can block a specific group of endpoint machines located at one site from sending traffic to any other site, block traffic between any two global groups, etc.

The second rule specifies that any data traffic that is (i) sent from external sources (e.g., external client devices attempting to access an application implemented by a set of logical network endpoint machines) and (ii) directed to machines belonging to Group 3 should be allowed. Functionally, this rule allows for external client devices to send traffic to the web tier VMs of one or more applications, irrespective of which site the VMs are located.

As mentioned previously, the network controllers of some embodiments operate at each site to, among other functions, provide configuration data from the local manager at the site to the computing devices of the site. In addition, these network controllers handle translating the group definitions defined at the global (or local) network managers into lists of network endpoint machines. In some embodiments, the local network manager at each site in the set of sites spanned by a group distributes the group definition to the set of network controllers at the site. The network controllers at each site resolve the group definition into a set of machine identifiers (e.g., a set of network addresses, UUIDs, etc.) by determining the machines that are located at their site and that meet the specified criteria for the group. In the case of a group with location criteria, the controllers at sites that are spanned by the group but not specified in the location criteria will not identify any machines at their site that meet the criteria.

Figure 13:
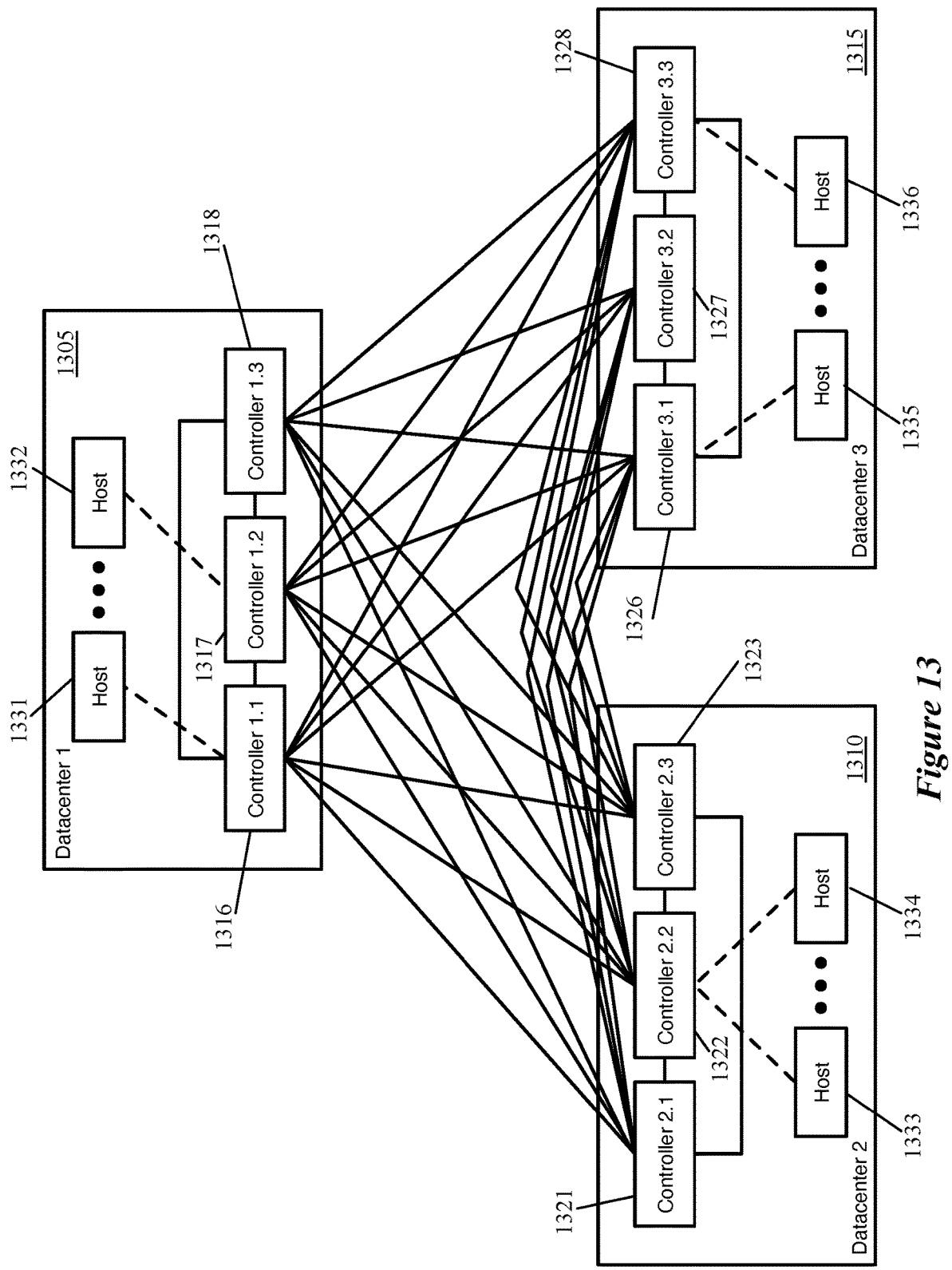
FIG. 13 conceptually illustrates a full mesh of network controllers across three sites (e.g., datacenters) in some embodiments.

In some embodiments, a cluster of network controllers (also referred to as the central control plane) operate at each site. The network controllers for a group of sites spanned by a logical network connect in a full mesh in some embodiments. FIG. 13 conceptually illustrates a full mesh of network controllers across three sites (e.g., datacenters) 1305-1315 in some embodiments. As shown, each of the sites 1305-1315 includes a cluster of three controllers, each of which communicates with the other controllers in the cluster. That is, at the first site 1305, the three controllers 1316-1318 communicate with each other; at the second site 1310, the three controllers 1321-1323 communicate with each other; and at the third site 1315, the three controllers 1326-1328 communicate with each other.

Each of the sites 1305-1315 also includes host computers (and edge devices, which are not shown in the figure) that receive configuration data from the controllers 1316-1328. In some embodiments, each computing device (e.g., each host computer and/or edge device) has a master network controller that is responsible for providing configuration data to that computing device, as well as receiving any runtime state changes from the computing device (e.g., the creation and/or deletion of logical network endpoint machines on the computing device). For example, in the first site 1305, host computer 1331 has controller 1316 as its master controller and host computer 1332 has controller 1317 as its master. In the second site 1310, both illustrated host computers 1333 and 1334 have controller 1322 as their master controller. In the third site 1315, host computer 1335 has controller 1326 as its master controller and host computer 1336 has controller 1328 as its master controller.

In addition, each controller at each of the sites communicates with each controller at each of the other sites. As shown in the figure, each of the controllers 1316-1318 at the first site 1305 has a connection to each of the controllers 1321-1323 at the second site 1310 and each of the controllers 1326-1328 at the third site 1315. Similarly, each of the controllers 1321-1323 at the second site 1310 has a connection to each of the controllers 1326-1328 at the third site 1315. Each of these connections is a bidirectional connection in some embodiments. However, as described further below and in U.S. patent application Ser. No. 16/906,935, now issued as U.S. Pat. No. 11,258,668, which is incorporated herein by reference, not all of the connections are used in all cases (and some connections may be unidirectional for the provision of logical network state).

Figure 14:
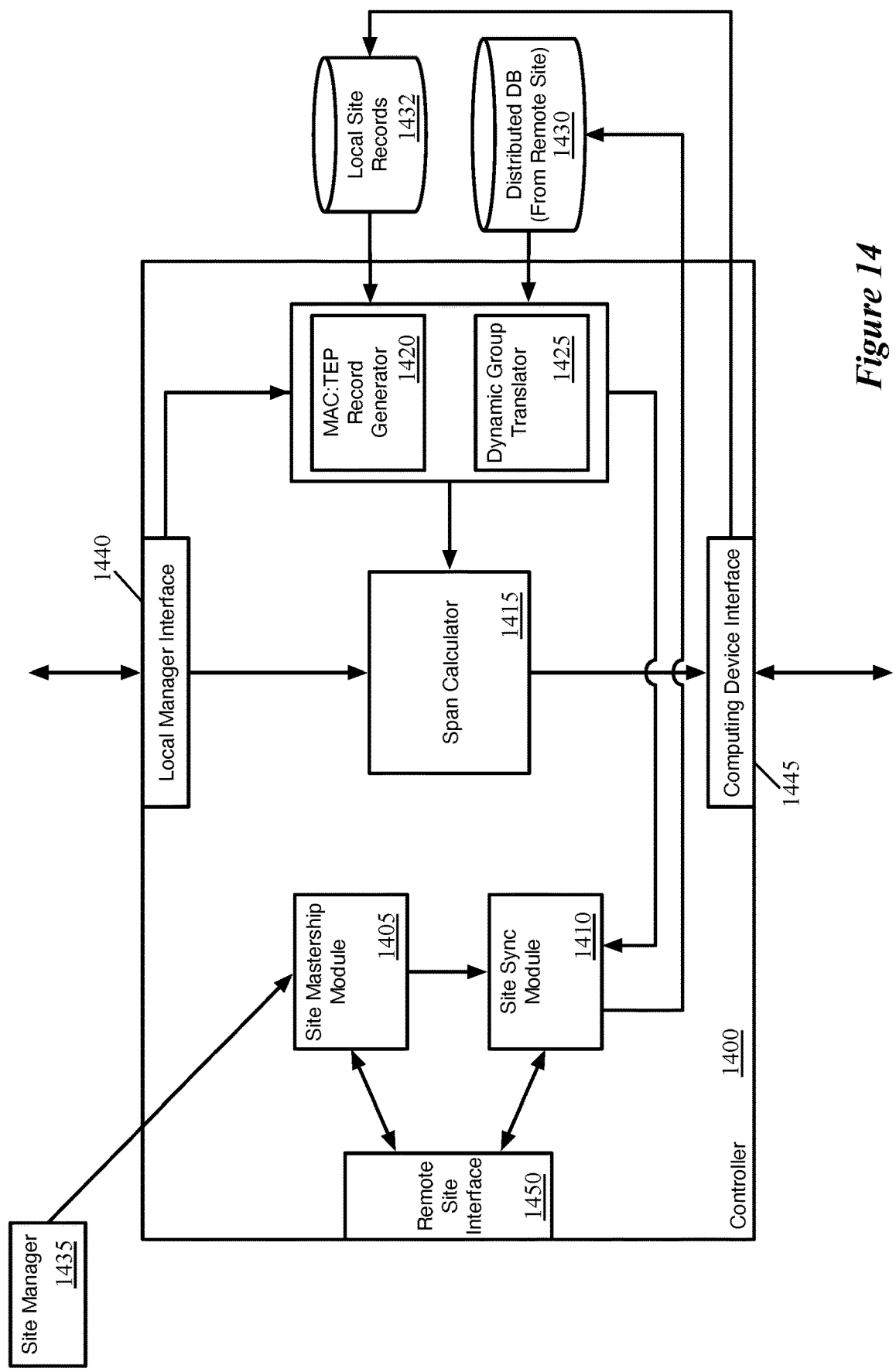
FIG. 14 conceptually illustrates the architecture of a network controller of some embodiments.

FIG. 14 conceptually illustrates the architecture of a network controller 1400 of some embodiments. In some embodiments, the network controller is an application operating on a computing device (e.g., executing within a VM or container, or on a bare metal operating system). The network controller 1400 includes a site mastership module 1405, a site sync module 1410, a span calculator 1415, a MAC:TEP record generator 1420, and a dynamic group translator 1425. The network controller also accesses a distributed database 1430 for storing data received from controllers at remote sites as well as a storage 1432 (e.g., another distributed database) for storing records of data for the local site. In some embodiments, the network controller 1400 has a separate distributed database (or separate database partition) for data from each remote site the controllers of which provide data to the network controller 1400 (or other controllers in the local cluster). In some embodiments, the distributed database 1430 and/or the local site records storage 1432 is stored on each of the computing devices on which the members of the network controller cluster operate. Each of the network controllers in the cluster therefore has access to the entire distributed database 1430 and the entire set of local site records 1432.

In some embodiments, a site manager 1435 for the controller cluster at each site exchanges certificates and any other required authentication information with the other sites (e.g., with the site managers of the other sites). This site manager 1435 then provides the network controllers at its site with the information (e.g., IP address, certificate, etc.) so that each network controller at the site has connectivity with each network controller at each of the other sites.

In some embodiments, the site mastership module 1405 receives this information from the site manager 1435 whenever a new site is added to the logical network. The site manager gathers the required authentication information and provides this information to the site mastership 1435 module 1405. In some embodiments, one controller from the cluster at each site is designated for sending logical network state data to each other site, and one controller from the cluster at each site is designated for receiving the logical network state data from each other site. To make the selection, the site mastership module 1405 of some embodiments uses a slot-based sharding mechanism (e.g., by computing a hash value modulo the number of available controllers in the cluster). In some embodiments, the sharding mechanism is deterministic (e.g., based on controller and/or site identifiers), and the site mastership module 1405 at each of the controllers in the cluster performs the same computations to determine the sender controller and receiver controller for communication with each other site. As an alternative or in addition to sharding based on sites, some embodiments shard the controller cluster based on logical network state (e.g., using one controller for sending security group data to a particular remote site and another controller for sending logical network to physical network mapping data to the particular remote site).

When the site mastership module 1405 determines that the network controller 1400 is the sender controller for a particular other site, the site sync module 1410 is responsible for communicating with that particular other site to provide logical network state data to the particular site via the remote site interface 1450. As described below, in some embodiments the MAC:TEP record generator 1420 and dynamic group translator 1425 retrieve the local site records 1432 and generate data to be provided to the remote sites (e.g., lists of MAC addresses located at the local site for logical switches spanning the local site and the particular remote site, lists of IP and MAC addresses for DCNs at the site belonging to various security groups). These sets of data are then provided to the site sync module 1410 to be provided to the remote site.

Similarly, when the site mastership module 1405 determines that the network controller 1400 is the receiver controller for a particular remote site, the site sync module 1410 is responsible for communicating with that particular remote site to receive logical network state data from the remote site via the remote site interface 1450. In some embodiments, the site sync module 1410 stores the logical network state data received from the controllers at other sites in the distributed database 1430 (e.g., in the specific database or database partition for that particular remote site).

In some embodiments, the network controller 1400 receives logical network configuration data from the local manager for the site via the local manager interface 1440 and stores this data in the distributed database 1430. The span calculator 1415 receives this network configuration data from the local manager interface 1440 (or from another controller in the cluster for the local site, if that other controller received the data from the local manager and stored the data in another shared database) and determines the computing devices to which the data should be distributed. At the global manager level, the span of a logical network element specifies the physical sites to which the configuration data for the logical network element is distributed. At the controller level for a particular site, the span specifies the computing devices (e.g., edge devices and/or host computers) in that particular site that require the configuration data for the logical network element. The span calculator 1415 identifies which logical network configuration data goes to which computing devices for which the network controller 1400 is the master controller, and sends this data to these computing devices (e.g., to local controllers on the devices) via the computing device interface 1445.

In addition to providing the configuration data from the local managers to the computing devices (i.e., host computers and edge devices) at their particular site, the network controllers for a particular site generate certain logical network state data and provide this generated logical network state data to (i) the computing devices at the particular site and (ii) the network controllers at other sites. In some embodiments, the network controller 1400 receives data from the computing devices at its site via the computing device interface 1445 and stores this data in the local site records storage 1432. This information includes information about logical network endpoint machines executing on the particular computing devices (e.g., MAC and IP addresses, tags, etc.) as well as information about the computing devices themselves (e.g., tunnel endpoint (TEP) IP addresses).

In some embodiments, the MAC:TEP record generator 1420 generates logical network address to physical network address (physical location) mapping data based on the data stored in the local site records 1432 and data from the remote site(s) stored in the distributed database 1430. These records can include records for computing devices at the local site as well as records to be provided to the remote site. In some embodiments, the dynamic group translator 1425 generates security group information, such as network addresses of logical network endpoint machines belonging to security groups.

The dynamic group translator 1425 receives group definitions from the local manager and endpoint machine information from the local site records 1432 and combines this information to generate the lists of network addresses (e.g., MAC and/or IP addresses) for different security groups. The dynamic group translator 1425, in some embodiments, evaluates the group membership criteria to determine which machines at the local site match these criteria for each group. In some embodiments, the dynamic group translator 1425 also combines this data with lists of network addresses for the security groups received from the remote site and stored in the distributed database 1430. These logical network state generation and distribution operations are described in further detail below.

The span calculator 1415 also receives generated logical network state data from the MAC:TEP record generator 1420 and/or the dynamic group translator 1425 and determines to which computing devices at the local site this logical network state data should be provided (e.g., based on the logical switch and/or security group to which the logical network state data pertains).

As noted, the logical network state data of some embodiments includes logical network address to physical network address (physical location) mapping data as well as security group information (e.g., network addresses of logical network endpoint DCNs belonging to security groups). Specifically, in some embodiments the controllers receive the definitions of dynamic security groups and use information received from the host computers at their site to determine the network addresses (e.g., MAC and IP addresses) for each dynamic security group that spans to the site.

Figure 15A:
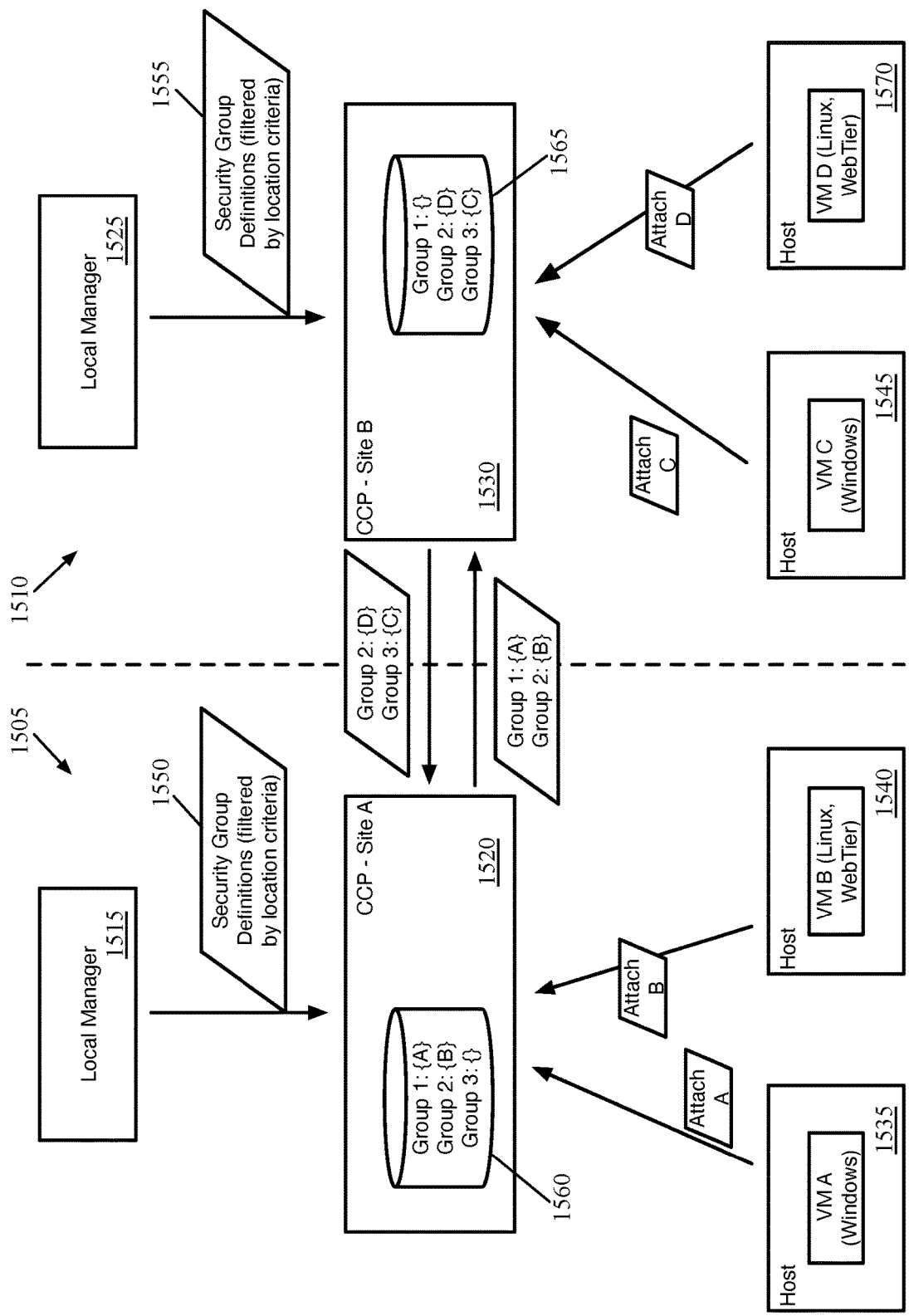
FIGS. 15A-B conceptually illustrate the generation and transmission of lists of logical network addresses for dynamic security groups both within a site and between sites.
Figure 15B:
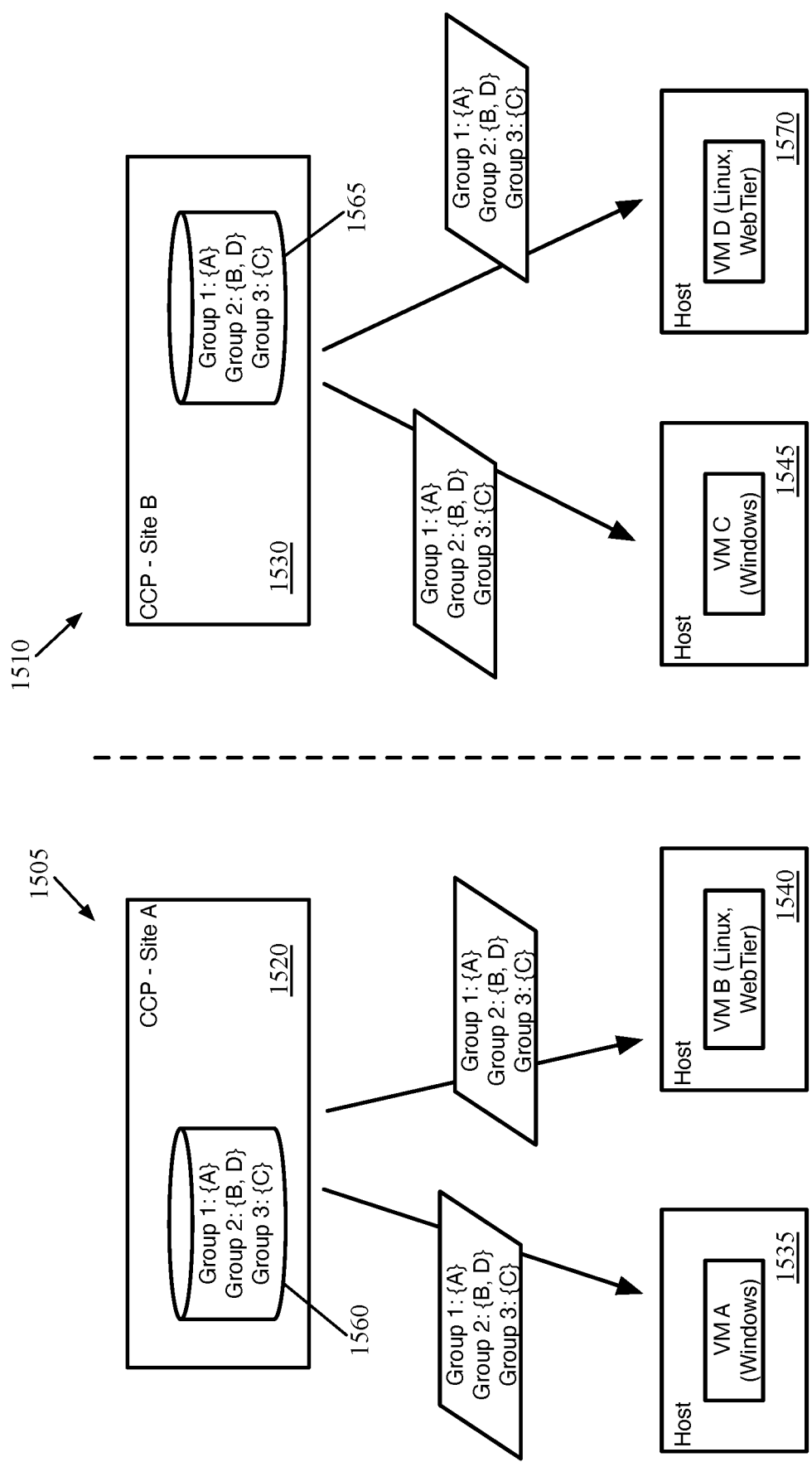

FIGS. 15A-B conceptually illustrate the generation and transmission of these lists of logical network addresses for dynamic security groups both within a site and between sites. In this example, two sites 1505 and 1510 are illustrated, corresponding to sites A and B from FIGS. 11 and 12. While these groups span three sites A-C as shown in FIG. 11, for simplicity only two of those sites are shown in this figure.

The first site 1505 includes a local manager 1515 and a CCP cluster 1520 (any internal data transfer among the nodes of the cluster is not shown). The second site 1510 includes a local manager 1525 and a CCP cluster 1530. In addition, the first site 1505 includes two relevant host computers 1535 (hosting VM A) and 1540 (hosting VM B), while the second site 1510 also includes two relevant host computers 1545 (hosting VM C) and 1570 (hosting VM D).

The controllers are responsible for determining which local logical network endpoint machines belong to each dynamic group. From the local managers 1515 and 1525, the CCPs 1520 and 1530 respectively receive definitions 1550 and 1555 of the dynamic groups that span to their sites. In some embodiments, these group definitions include security groups defined at the global manager for the global logical network as well as any security groups defined at the respective local manager.

In this example, each CCP 1520 and 1530 receives the definitions 1105-1115 (i.e., the membership criteria and/or span) for Groups 1-3. In some embodiments, the local managers 1515 and 1525 evaluate the location criteria for the groups and push down to the central controllers only the membership criteria that is relevant for the site. For instance, in this example the local manager 1515 (or the management plane at site 1505, if separate) determines that because Group 1 is restricted to site 1505 that the membership criteria includes all machines running the Windows operating system. On the other hand, Group 3 is restricted to site 1510 and therefore the membership criteria pushed to the CCP 1520 is the null set. Group 2 does not have any location criteria, so its membership criteria is pushed to the CCP 1520 as is. Correspondingly, the local manager 1525 pushes the null set to CCP 1530 as the membership for Group 1 but pushes the membership criteria including all machines running the Windows operating system for Group 3. Group 2 does not have any location criteria, so its membership criteria is pushed to the CCP 1530 as is.

In some embodiments, group definitions can also include more complex Boolean clauses that are partially evaluated at the local manager (or management plane) and partially evaluated at the CCP. For instance, the membership criteria for a group could be ((Windows VM at Site A) OR (Linux VM at Site B)). In this case, the CCP at Site A would receive the membership criteria as simply including all Windows VMs, while the CCP at Site B would receive the membership criteria for the same group as including all Linux VMs.

In some embodiments, when a logical network endpoint machine (e.g., any of VMs A-D) is created on a host computer, that host computer reports the new machine along with data about the machine to one of the network controllers of the cluster. This data includes not only the MAC and IP addresses of the machine but also information about the logical switch to which the machine attaches as well as various other runtime state data for the machine in some embodiments. As shown, host computer 1535 reports the attachment of VM A and host computer 1540 reports the attachment of VM B to the CCP 1520, while host computer 1545 reports the attachment of VM C and host computer 1570 reports the attachment of VM D to the CCP 1530.

When a logical network endpoint machine matches the set of criteria for a particular security group, the controller adds the logical network addresses (e.g., MAC and IP addresses) for the machine to the security group. In some embodiments, the controllers use information received from a host computer when the machine is created on the host computer to (i) identify to which groups the machine belongs and (ii) identify the MAC and IP addresses to add to the lists for the identified groups. The CCP 1520 identifies that VM A (a Windows VM) matches the criteria for Group 1, while VM B (a Linux web tier VM) matches the criteria for Group 2. Because the membership criteria received by the CCP 1520 at site 1505 for Group 3 is the null set, neither VM is added to this group. At the second site 1510, the CCP 1530 determines that VM C (a Windows VM) belongs to Group 3, while VM D (a Linux web tier VM) belongs to Group 2. These CCPs store this information in their respective storages 1560 and 1565. In some embodiments, these storages 1560 and 1565 represent the amalgamation of the stored security group information at each of the controller clusters. As described above, in some embodiments the data storing lists of network addresses for each security group is stored separately for each site (i.e., different storages for each remote site as well as for the local site).

For each group spanning multiple sites, the controller clusters at those sites share the list of logical network addresses belonging to the group with each other. The controllers then provide the full list of addresses for each group to the host computers and/or edge devices that enforce policy rules using the security groups. As shown in FIG. 15A, the CCP 1520 at the first site 1505 provides data to the CCP 1530 at the second site 1510 indicating the network addresses located in the first site 1505 for both of Group 1 and Group 2. Correspondingly, the CCP 1530 at the second site 1510 provides data to the CCP 1520 at the first site 1505 indicating the network addresses located in the second site for Group 2 and Group 3. No data is sent to the second site 1510 for Group 3 because no VMs at the first site 1505 belong to this security group, and similarly no data is sent to the first site for Group 1. In addition, it should be noted that this information is also exchanged with the CCP at the third site C (which is not shown in this figure), as each of these groups spans all of sites A-C.

FIG. 15B illustrates that the CCPs 1520 and 1530 have updated their respective storages 1560 and 1565 to include the logical network state data received from the other site (e.g., by adding this information to their respective distributed databases for storing data from the respective remote site). In addition, this information is provided to each of the host computers at their respective sites. The host computers 1535 and 1540 at the first site 1505 receive information about the complete group membership for Groups 1, 2, and 3 from the hosts CCP 1520, while the host computers 1545 and 1570 at the second site 1510 receive information about the complete group membership for these groups from the CCP 1530.

In the previous examples, the controller clusters send all of the state from their respective sites at once. While this is plausible for the simple examples shown in these figures, realistic examples may have hundreds or thousands of network addresses associated with a single security group or logical switch in one site, with many different security groups and/or logical switches for which network state data needs to be synchronized between sites. In such a situation, updates will occur frequently, and it would be very bandwidth-intensive to transfer the entire logical network state with each update.

Instead, when providing updates to the logical network state data, some embodiments send each change to the current state as an atomic update specifying the change, thereby minimizing the amount of data that needs to be transferred between sites. The controllers at a particular site maintain a snapshot of the current logical network state (e.g., in the distributed database at the site), and whenever this state changes (e.g., due to creation or deletion of a machine from a host computer in the site), each controller that handles sending that state to another site identifies the change and sends the change as an update to the other site.

In addition to receiving the group definitions from the controllers, the computing devices (host computers and edge devices) also receive the policies to be enforced at their respective sites. In some embodiments, either the central controllers at each site or local controllers on each host and edge device use the group definition to express the policies in terms of the network addresses rather than group identifiers (or other DCN identifiers). In some embodiments, a single policy is expressed as numerous security rules in the network element as the network elements evaluate these rules for a single matching expression (i.e., a single source address and single destination address).

Figure 16:
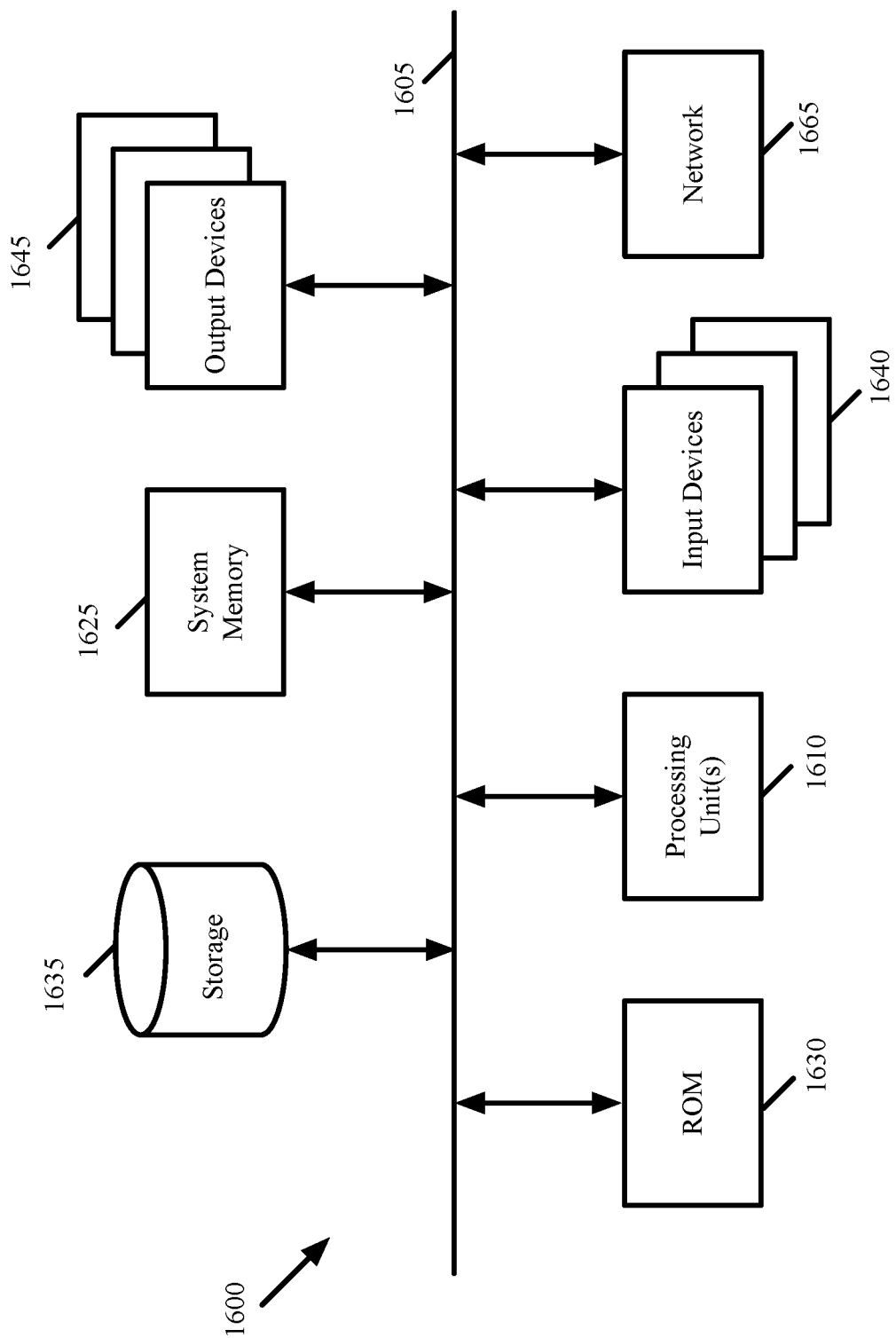
FIG. 16 conceptually illustrates an electronic system with which some embodiments of the invention are implemented.

FIG. 16 conceptually illustrates an electronic system 1600 with which some embodiments of the invention are implemented. The electronic system 1600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1625, and the permanent storage device 1635.

From these various memory units, the processing unit(s) 1610 retrieve instructions to execute and data to process in order to execute the processes of the invention. The processing unit(s) may be a single processor or a multi-core processor in different embodiments.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1625 is a read-and-write memory device. However, unlike storage device 1635, the system memory is a volatile read-and-write memory, such a random-access memory. The system memory stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select commands to the electronic system. The input devices 1640 include alphanumeric keyboards and pointing devices (also called "cursor control devices"). The output devices 1645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples electronic system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for distributing a group definition for a group of machines, the method comprising:
    receiving the group definition comprising (i) a span of the group that specifies a set of sites at which the group is to be used and (ii) a set of criteria for machines to be included in the group, the set of criteria comprising at least a location criteria specifying one or more sites, wherein each site is a different datacenter comprising a respective plurality of computing devices for hosting the machines; and
    distributing the group definition to each site in the set of sites,
    wherein at each site in the set of sites a local network control system of the site determines a set of machines in the group based on the set of criteria and provides the determined set of machines in the group to a set of computing devices that enforce security rules that use the group, wherein only machines in the one or more sites specified by the location criteria are determined to be in the group, wherein the group is used to define security rules that are enforced by computing devices at sites that belong to the set of sites including at least one site that is not in the one or more sites specified by the location criteria.

2. The method of claim 1, wherein the method is performed by a global network manager that manages a logical network defined across a plurality of sites that includes the set of sites.

3. The method of claim 2, wherein the machines in the group are connected through the logical network.

4. The method of claim 2, wherein distributing the group definition comprises distributing, to a local network manager at each site in the set of sites, a logical network definition customized to the site that includes the group definition.

5. The method of claim 4, wherein at each site in the set of sites, a set of network controllers receives the group definition from the local network manager at the site and determines the set of machines in the group based on the set of criteria.

6. The method of claim 1, wherein at each site in the set of sites, the local network control system at the site:
    determines a set of identifiers for machines that are (i) located at the site and (ii) meet the set of criteria;
    provides the set of identifiers determined for the site to the local network control systems at each of the other sites in the set of sites; and
    from the respective local network control systems at each respective site of the other sites in the set of sites, receives a respective set of identifiers determined for the respective site for machines located at the respective site that meet the set of criteria.

7. The method of claim 6, wherein the local network control systems at sites that are in the set of sites but not in the one or more sites specified by the location criteria for the group determine that no machines at their sites are in the group but receive the sets of identifiers for machines from the local network control systems at each of the sites specified by the location criteria.

8. The method of claim 1 further comprising receiving a definition of a network policy domain that specifies a plurality of sites belonging to the network policy domain.

9. The method of claim 8, wherein the group definition is associated with the network policy domain, wherein the span of the group is based on the plurality of sites belonging to the network policy domain.

10. The method of claim 8 further comprising receiving a network policy rule defined using the group of machines.

11. The method of claim 10, wherein the network policy rule is a firewall rule for data messages from a set of source addresses to a set of destination addresses, wherein one of the set of source addresses and the set of destination addresses is defined using the group of machines.

12. The method of claim 1, wherein the set of criteria for machines to be included in the group comprises at least one additional criteria indicating a characteristic of machines that is required for machines to be determined to be in the group.

13. A non-transitory machine readable medium storing a program which when executed by at least one processing unit distributes a group definition for a group of machines, the program comprising sets of instructions for:
    receiving the group definition comprising (i) a span of the group that specifies a set of sites at which the group is to be used and (ii) a set of criteria for machines to be included in the group, the set of criteria comprising at least a location criteria specifying one or more sites, wherein each site is a different datacenter comprising a respective plurality of computing devices for hosting the machines; and
    distributing the group definition to each site in the set of sites,
    wherein at each site in the set of sites a local network control system of the site determines a set of machines in the group based on the set of criteria and provides the determined set of machines in the group to a set of computing devices that enforce security rules that use the group, wherein only machines in the one or more sites specified by the location criteria are determined to be in the group, wherein the group is used in security rules that are enforced by computing devices at sites that belong to the set of sites including at least one site that is not in the one or more sites specified by the location criteria.

14. The non-transitory machine readable medium of claim 13, wherein the program is a global network manager application that manages a logical network defined across a plurality of sites that includes the set of sites.

15. The non-transitory machine readable medium of claim 14, wherein the machines in the group are connected through the logical network.

16. The non-transitory machine readable medium of claim 14, wherein:
the set of instructions for distributing the group definition comprises a set of instructions for distributing, to a local network manager at each site in the set of sites, a logical network definition customized to the site that includes the group definition; and
at each site in the set of sites, a set of network controllers receives the group definition from the local network manager at the site and determines the set of machines in the group based on the set of criteria.

17. The non-transitory machine readable medium of claim 13, wherein at each site in the set of sites, the local network control system at the site:
determines a set of identifiers for machines that are (i) located at the site and (ii) meet the set of criteria;
provides the set of identifiers determined for the site to the local network control systems at each of the other sites in the set of sites; and
from the respective local network control systems at each respective site of the other sites in the set of sites, receives a respective set of identifiers determined for the respective site for machines located at the respective site that meet the set of criteria.

18. The non-transitory machine readable medium of claim 17, wherein the local network control systems at sites that are in the set of sites but not in the one or more sites specified by the location criteria for the group determine that no machines at their sites are in the group but receive the sets of identifiers for machines from the local network control systems at each of the sites specified by the location criteria.

19. The non-transitory machine readable medium of claim 13, wherein the program further comprises a set of instructions for receiving a definition of a network policy domain that specifies a plurality of sites belonging to the network policy domain.

20. The non-transitory machine readable medium of claim 19, wherein the group definition is associated with the network policy domain, wherein the span of the group is based on the plurality of sites belonging to the network policy domain.

21. The non-transitory machine readable medium of claim 19, wherein the program further comprises a set of instructions for receiving a network policy rule defined using the group of machines.

* * * * *